United States Patent [19]
Suzuki

[11] Patent Number: 5,313,277
[45] Date of Patent: May 17, 1994

[54] IMAGE PICKUP DEVICE HAVING WHITE BALANCE CONTROL FUNCTION

[75] Inventor: Masao Suzuki, Tokyo, Japan

[73] Assignee: Canon Kabushiki Kaisha, Tokyo, Japan

[21] Appl. No.: 782,135

[22] Filed: Oct. 25, 1991

[30] Foreign Application Priority Data

Oct. 30, 1990 [JP] Japan .................................. 2-290821
Oct. 30, 1990 [JP] Japan .................................. 2-290822

[51] Int. Cl.⁵ ............................................. H04N 9/73
[52] U.S. Cl. ..................................... 348/223; 348/226
[58] Field of Search ............... 358/41, 228, 227, 29 C; H04N 9/73 C

[56] References Cited

U.S. PATENT DOCUMENTS

| | | | |
|---|---|---|---|
| 4,595,946 | 6/1986 | Uehara et al. | 358/29 C |
| 4,774,564 | 9/1988 | Konishi | 358/41 |
| 4,991,944 | 2/1991 | Hirao et al. | 358/227 |
| 4,992,855 | 2/1991 | Takei | 358/29 C |
| 5,001,552 | 3/1991 | Okino | 358/41 |

FOREIGN PATENT DOCUMENTS

| | | | |
|---|---|---|---|
| 0128694 | 6/1986 | Japan | H04N 9/73 C |
| 0265885 | 11/1987 | Japan | H04N 9/73 C |
| 0060088 | 3/1989 | Japan | H04N 9/73 C |

Primary Examiner—James J. Groody
Assistant Examiner—Jeffrey S. Murrell
Attorney, Agent, or Firm—Morgan & Finnegan

[57] ABSTRACT

There is provided an apparatus having a discriminating circuit to discriminate a magnitude of an occupied area of a single object in a picture plane with respect to a video signal formed by an image pickup element from an object light when a white balance of the video signal is adjusted, wherein by controlling the white balance adjusting operation in accordance with an output of the discriminating circuit, the white balance can be preferably controlled even when the occupied area of the single object is large. Upon macro photographing as well, by making the white balance adjusting operation different from the operation in the ordinary photographing mode, the white balance can be preferably controlled.

22 Claims, 22 Drawing Sheets

| FIG. 19A |
|---|
| FIG. 19B |

IMAGE PICKUP DEVICE HAVING WHITE BALANCE CONTROL FUNCTION

BACKGROUND OF THE INVENTION

1. Field of the Invention

The invention relates to an image pickup device and, more particularly, to an image pickup device for controlling a white balance by using an image signal obtained by an image pickup element.

2. Related Background Art

An image pickup device such as video camera, electronic still camera, or the like has white balance adjusting means for adjusting so that a reproduced white color becomes the correct white color. In recent years, a TTL (through the taking lens) adjusting method whereby the white balance is automatically adjusted by an output signal of the image pickup element is frequently used.

FIG. 1 is a block diagram of a conventional image pickup device having the white balance adjusting means of the integrating type (averaging type) TTL method. In FIG. 1, reference numeral 1 denotes a lens; 2 an image pickup element such as a CCD or the like to perform a photoelectric conversion; 3 a luminance signal processing unit to derive a luminance signal Y from an output of the image pickup element 2; 4 a chroma signal processing unit to derive a low frequency component $Y_L$ of the luminance signal, a red signal R, and a blue signal B from the output of the image pickup element 2; 5 and 6 an R gain control unit and a B gain control unit for changing signal levels of the output signals R and B of the chroma signal processing unit 4; 7 and 8 matrix amplifiers to derive color difference signals R-Y and B-Y from the output $Y_L$ of the chroma signal processing unit 4 and outputs R' and B' of the R and B gain control units 5 and 6; and 9 a modulation processing unit for modulating the output Y of the luminance signal processing unit 3 and the outputs R-Y and B-Y of the matrix amplifiers 7 and 8 into specified signals and for enabling those signals to be recorded onto a recording medium or the like (not shown) or an image to be displayed by a monitor. Reference numerals 10 and 11 denote averaging units to average the output signals R-Y and B-Y of the matrix amplifiers 7 and 8 by a few picture planes by integrating them or the like. Reference numeral 32 denotes a control voltage deriving unit for deriving a control voltage suitable for the white balance from outputs of the averaging units 10 and 11 and for controlling the R and B gain control units 5 and 6.

The operation of the above conventional device will now be described hereinbelow with reference to FIG. 1.

An object image formed on the image pickup element 2 is first converted into an electric signal. An output signal of the image pickup element 2 is sent to the luminance signal processing unit 3 and chroma signal processing unit 4. The luminance signal Y is derived from the luminance signal processing unit 3. The low frequency component $Y_L$ of the luminance signal and the red and blue signals R and B are derived from the chroma signal processing unit 4. The signal $Y_L$ is a signal in which the red (R), blue (B), and green (G) components are mixed at a ratio of 0.30 (R): 0.59 (G): 0.11(B). That is, $Y_L = 0.30R + 0.59G + 0.11B$. The signals R and B among the outputs derived from the chroma signal processing unit 4 are sent to the R and B gain control units 5 and 6, by which their signal levels are changed to adjust the white balance, so that the signals R' and B' are generated. The output $Y_L$ of the chroma signal processing unit 4 and the outputs R' and B' of the R and B gain control units 5 and 6 are sent to the matrix amplifiers 7 and 8, from which the color difference signals R-Y and B-Y are obtained. Wherein, $R-Y = 0.70R - 0.59G - 0.11B$ $B-Y = 0.89B - 0.59G - 0.30R$ The signals Y, R-Y, and B-Y are sent to the modulation processing unit 9 and are modulated into specified signal formats such as to enable the signals to be recorded onto the recording medium or the like or to enable an image to be displayed onto the monitor and are generated.

The output signals R-Y and B-Y of the matrix amplifiers 7 and 8 are also sent to the averaging units 10 and 11, by which average values of the image signals of one or more picture planes are obtained. The control voltage deriving unit 32 derives control voltages to the R and B gain control units 5 and 6 such that the average signal levels are set to the 0 level (that is, R=B=G), thereby adjusting the white balance.

In the above conventional device, however, in the case of the image pickup of a scene such that a high chroma object occupies almost of the picture plane, there is a problem such that it is difficult to suitably adjust the white balance.

Even in the case of the peak method whereby the color difference signals in the portion where the luminance signal level is equal to or higher than a predetermined value are sampled and the sampled values are used to adjust the white balance without using the average values of the color difference signals as in the conventional device, the signals whose levels are equal to or higher than the predetermined level are not always an achromatic color, so that the white balance cannot be preferably adjusted. Further, a method in which both of the above methods are used in combination is also proposed. Such a method, however, has a problem such that the number of component elements is large and a construction is complicated and a remarkable improvement effect is not obtained.

There is also a problem such that when an ordinary object is photographed, an adequate accuracy is not obtained with respect to the white balance in the case of the peak method.

SUMMARY OF THE INVENTION

It is an object of the invention to provide an image pickup device which can preferably control the white balance irrespective of the characteristics of an object under the circumstances as mentioned above.

To accomplish the above object, according to the invention, as an embodiment, there is disclosed an image pickup device comprising: (a) image pickup means for forming a video signal from an object light; (b) adjusting means for adjusting a white balance of the video signal which is generated from the image pickup means; (c) discriminating means for discriminating a magnitude of an area which is occupied by the single object in a picture plane with respect to the video signal; and (d) control means for controlling the operation of the adjusting means in accordance with an output of the discriminating means.

The above and other objects and features of the present invention will become apparent from the following detailed description and the appended claims with reference to the accompanying drawings.

DETAILED DESCRIPTION OF THE PREFERRED EMBODIMENTS

Figure 2:
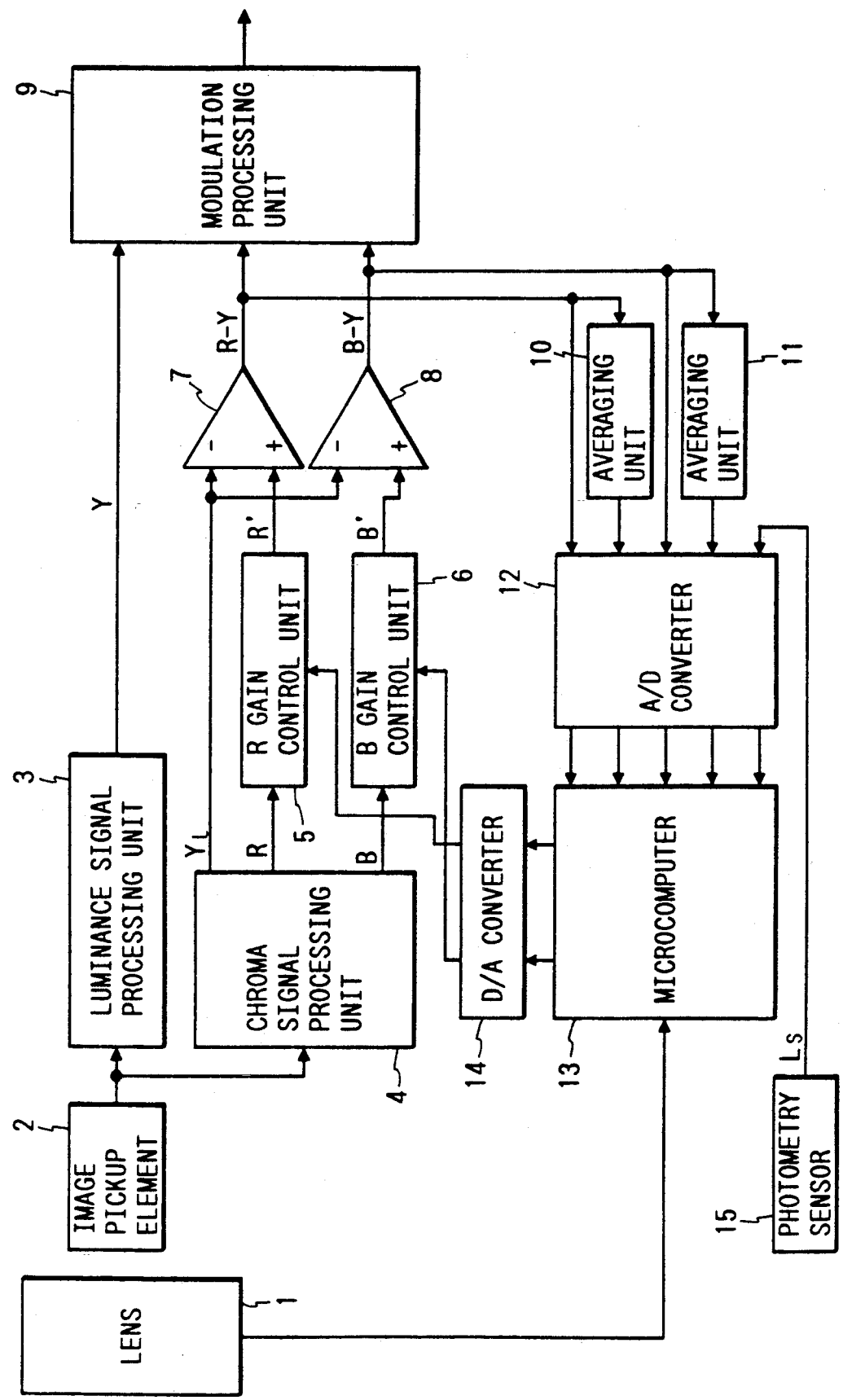
FIG. 2 is a block diagram showing a construction of an image pickup device of the first embodiment of the invention.

Embodiments of the invention will be described in detail hereinbelow. FIG. 2 is a block diagram showing a construction of an image pickup device according to the first embodiment of the invention.

Figure 1:
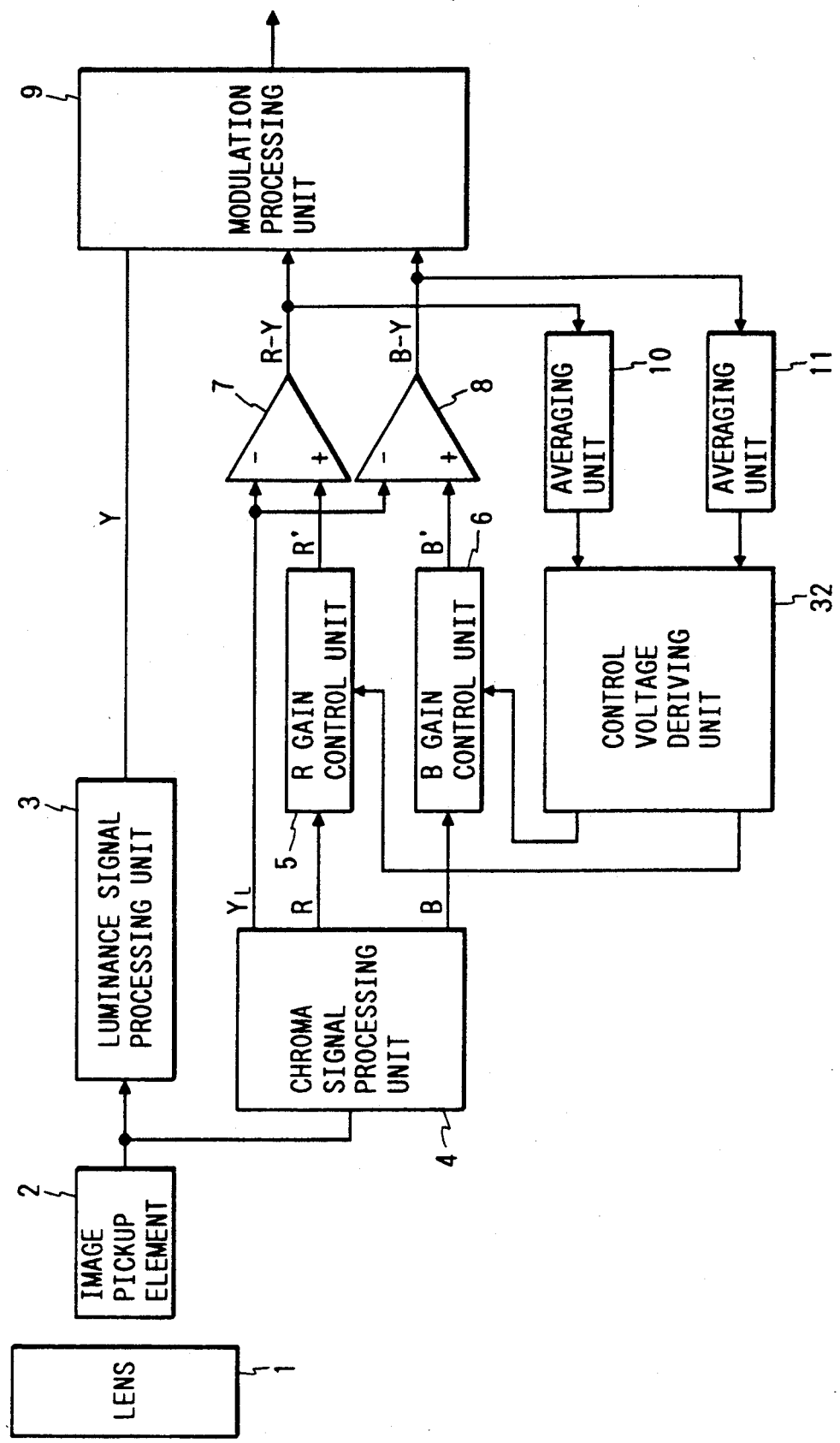
FIG. 1 is a block diagram showing a construction of a conventional image pickup device.

In FIG. 2, reference numerals 1 to 11 denote the same component elements as those shown in the conventional device of FIG. 1. Reference numeral 12 denotes an A/D (analog-digital) converter; 13 a microcomputer system; 14 a D/A (digital-analog) converter; and 15 a photometry sensor to measure the brightness of an external light.

Figures 3, 3A, 3B:
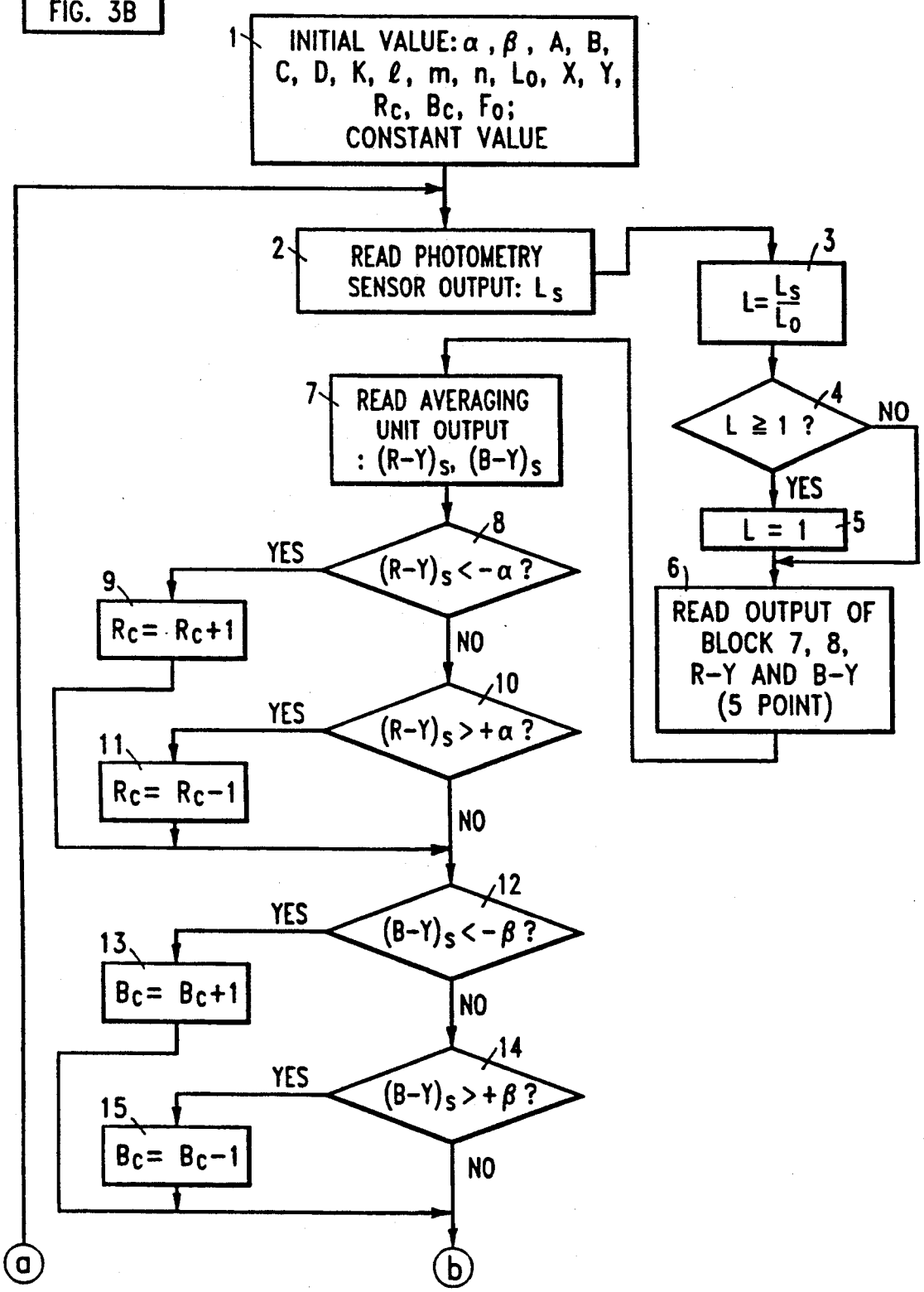
FIGS. 3A, 3B and 4 are flowcharts showing the operation of the device of FIG. 2.
Figure 3B:
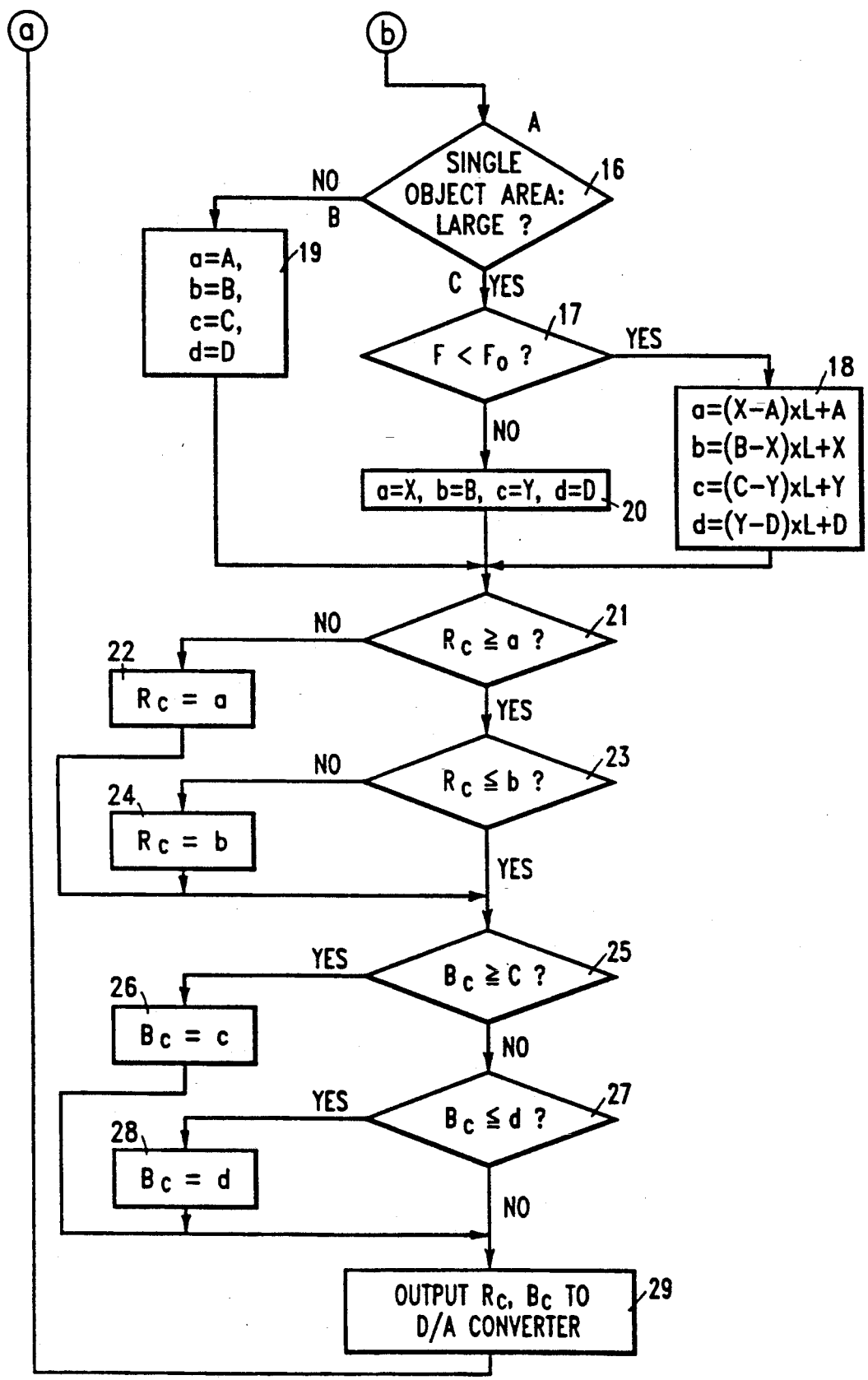
Figure 4:
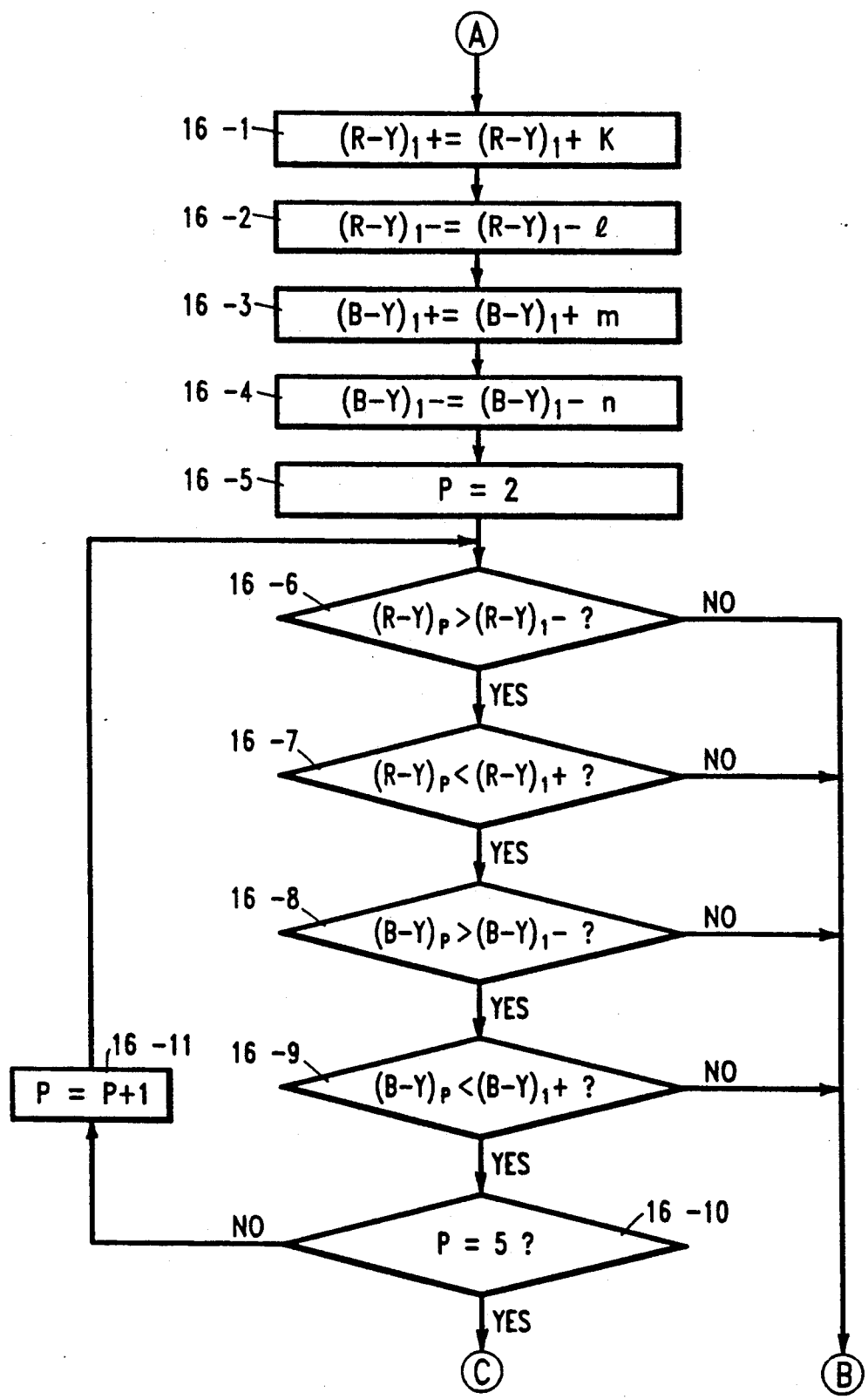
Figure 5:
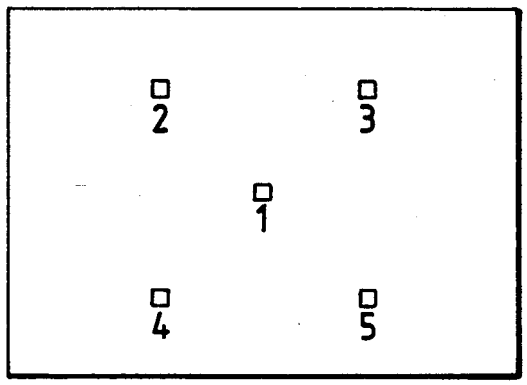
FIG. 5 is a diagram showing sampling points to determine an occupied area according to the device of FIG. 2.
Figure 6:
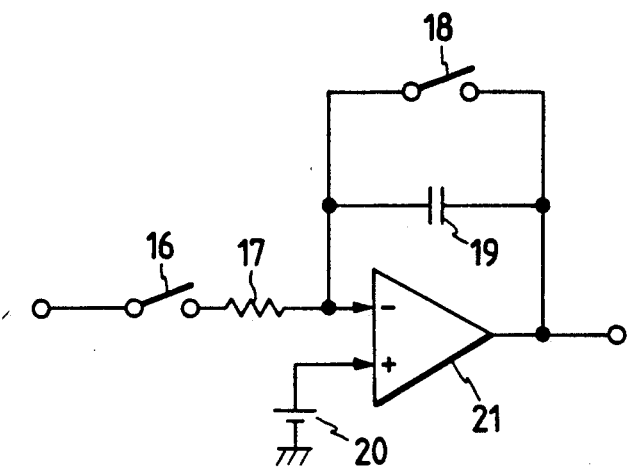
FIG. 6 is a diagram showing a construction of an averaging unit in FIG. 2.
Figure 7:
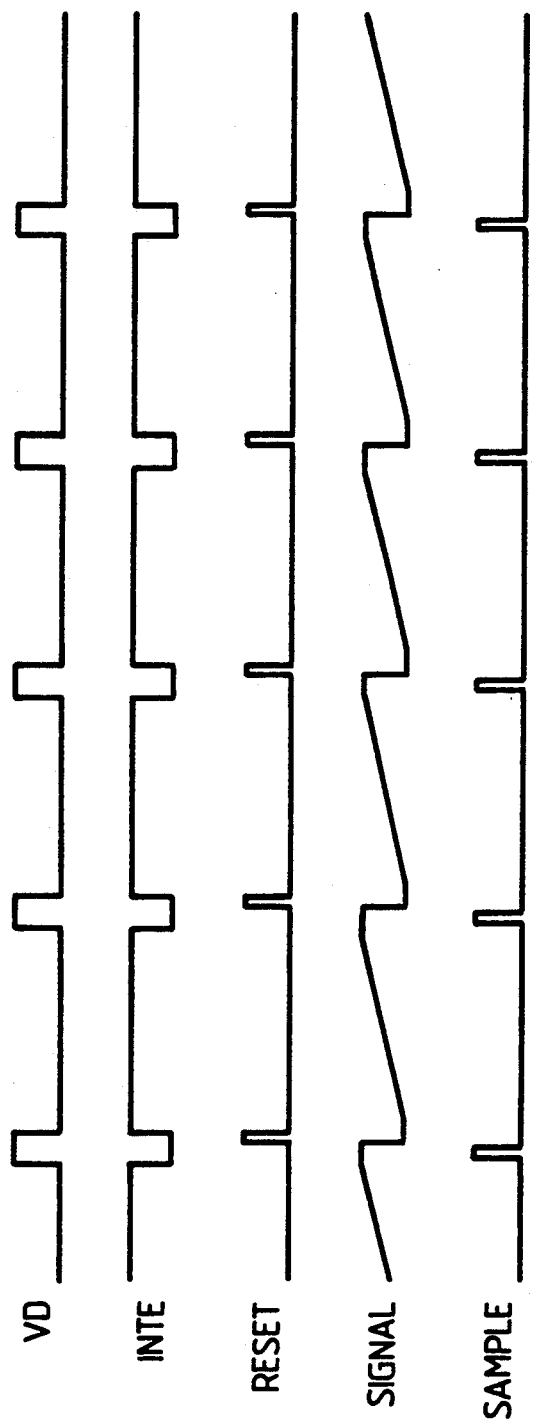
FIG. 7 is a timing chart showing waveforms in respective sections in FIG. 6.
Figure 8:
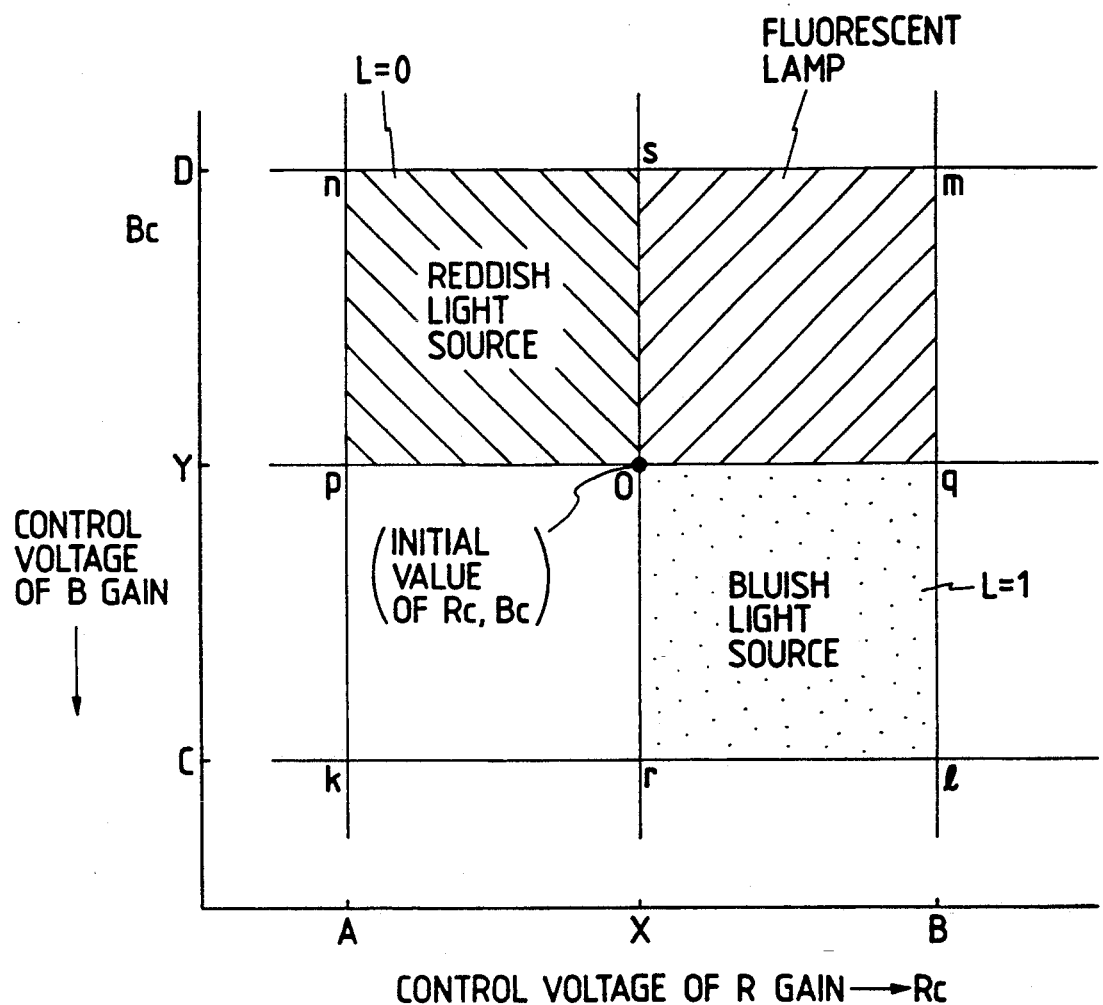
FIG. 8 is a diagram for explaining a range of a white balance adjustment in the device of FIG. 2.

FIGS. 3 and 4 are flowcharts showing the operations of the microcomputer 13 in FIG. 2. FIG. 5 is a diagram for explaining the operation to determine an occupied area in the device of FIG. 2. FIGS. 6 and 7 are a constructional diagram and a timing chart for explaining the operations of the averaging units 10 and 11. FIG. 8 is a diagram for explaining a limit range of the white balance adjustment in the embodiment.

The embodiment will now be described hereinbelow with reference to FIGS. 2 to 8.

In FIG. 2, the operations of the component elements 1 to 11 are substantially the same as those in the conventional device of FIG. 1. The operations of the averaging units 10 and 11 will now be described with reference to FIGS. 6 and 7.

In the case of the block 10, the R-Y signal is supplied to the input side of a switch 16 in FIG. 6. In the case of the block 11, the B-Y signal is supplied to the input side of the switch 16. The switch 16 is closed when a signal INTE in FIG. 7 is at the high level. The switch 16 is opened when it is at the low level. Only when the switch 16 is closed, the color difference signals R-Y and B-Y are supplied to an integrating circuit comprising a resistor 17, a capacitor 19, a reference voltage source 20, and a differential amplifier 21. On the other hand, since a switch 18 is closed when a signal RESET in FIG. 7 is at the high level, the charges accumulated in the capacitor 19 are discharged for the above period of time.

Thus, the outputs of the averaging units 10 and 11 are set to waveforms as shown in SIGNAL in FIG. 7. The average level of each of the R-Y and B-Y signals in one picture plane can be detected by A/D converting the outputs of the averaging units 10 and 11 by the A/D converter 12 for the period of time when SAMPLE in FIG. 7 is at the high level. VD denotes a vertical driving signal of the image pickup element 2.

Each of the average values obtained as mentioned above is supplied to the microcomputer 13 through the A/D converter 12. On the basis of the average values, the control voltage to adjust the white balance is derived by the microcomputer 13. The operation will now be described hereinbelow with reference to FIGS. 3, 4, 5, and 8.

As shown in step in the flowchart of FIG. 3, predetermined values $\alpha, \beta, A, B, C, D, k, l, m, n, L_0, X, Y, R_c, B_c$, and $F_0$ are set as initial values in a memory in the microcomputer. As shown in step ② in the flowchart, an output $L_s$ of the photometry sensor 15 is read through the A/D converter 12 and is divided by the constant $L_0$, thereby obtaining L (refer to step ③). $L_0$ denotes a value indicative of the average brightness of the outdoor light. When the value L is equal to or larger than 1, L is fixed to 1 (steps ④ and ⑤). When $L<1$, the processing routine directly advances from step ④ to step ⑥. In step ⑥, signals $(R-Y)_1$ to $(R-Y)_5$ as R-Y signals and $(B-Y)_1$ to $(B-Y)_5$ as B-Y signals at five positions on the screen shown by "☐" in FIG. 5 are read from the matrix amplifiers 7 and 8 through the A/D converter 12.

Outputs $(R-Y)_s$ and $(B-Y)_s$ of the averaging units 10 and 11 are subsequently read (step ⑦) and the control voltages $R_c$ and $B_c$ of the R and B gains to adjust the white balance are set as follows.

$R_c = R_c + 1$ when $(R-Y)_s < -\alpha$ $R_c = R_c - 1$ when $(R-Y)_s > \alpha$ $B_c = B_c + 1$ when $(B-Y)_s < -\beta$ $B_c = B_c - 1$ when $(B-Y)_s > \beta$ The control voltages $R_c$ and $B_c$ are unchanged, namely, are held to the initial values in the cases other than the above four cases. (steps ⑧ to ⑮)

The control voltage $R_c$ of the R gain is set in a manner such that when the value of $R_c$ is large, the gain of the R gain control unit increases and the R signal level rises. The control voltage $B_c$ of the B gain is set in a manner such that, on the contrary, when the value of $B_c$ is large, the gain of the B gain control unit 6 decreases and the B signal level decreases. The initial values of the control voltages $R_c$ and $B_c$ are set to intermediate values of the ranges which can be obtained in order to enable the final outputs of $R_c$ and $B_c$ to be quickly specified. After the values of the control voltages $R_c$ and $B_c$ were set as mentioned above, a state of the pickup image is discriminated by checking whether a single object occupies a large area or not (step ⑯). The discriminating method will now be described further in detail with reference to FIG. 4.

In FIG. 4, the constant values k, l, m, and n are added to or subtracted from $(R-Y)_1$ and $(B-Y)_1$ as R-Y and B-Y signals in the central portion of the picture plane (refer to FIG. 5), thereby deriving the following values (steps ⑯-1 to ⑯-4).

$(R-Y)_{1+} = (R-Y)_1 + k$ $(R-Y)_{1-} = (R-Y)_1 - l$ $(B-Y)_{1+} = (B-Y)_1 + m$ $(B-Y)_{1-} = (B-Y)_1 - n$

Subsequently, P=2 is set to an initial value, the values of $(R-Y)_p$ and $(R-Y)_{1+}$ and $(R-Y)_{1-}$ are compared, and $(B-Y)_p$ and $(B-Y)_{1+}$ and $(B-Y)_{1-}$ are compared (steps ⑯-6 to ⑯-9). When either one of the results of the discriminating steps ⑯-6 to ⑯-9 is NO, the processing routine advances to Ⓑ, namely, step ⑲ in FIG. 2. On the contrary, when all of the discrimination results are YES, a check is made to see if P=5 or not (⑯-10). When P≠5, P is increased by 1 (⑯-11) and the processing routine is returned to step ⑯-6 and the similar processes are repeated. When P=5, this means that all of the comparing processes at the five points in FIG. 5 have been finished, so that the processing routine advances from step ⑯-10 to Ⓒ, that is, to step ⑰ in FIG. 3.

By the flow of FIG. 4, it is possible to detect whether levels of all of the color difference signals at the points 2 to 5 shown in FIG. 5 are approximate to the level of the color difference signal at the point of 1 or not. When all of them are at the approximate levels, it is determined that the occupied area of the single object is large.

When the occupied area of the single object is not large, limit ranges a, b, c, and d of the control voltage are set to the initial values A, B, C, and D as shown in step ⑲ (refer to step ⑲ and FIG. 8).

On the other hand, when the single object area is large, a flicker component F of the external light is first derived from the output of the photometry sensor 15 in step ⑰ and is compared with a reference value $F_0$. When $F < F_0$, the light source is regarded to be a non-flicker light source. When $F \geq F_0$, the light source is regarded to be a flicker light source, namely, a fluorescent lamp. Therefore, when $F < F_0$, the limit ranges a, b, c, and d are set as follows.

$a = (X-A) \times L + A$ $b = (B-X) \times L + X$ $c = (C-Y) \times L + Y$ $d = (Y-D) \times L + D$ (refer to step ⑱ and FIG. 8). When $F \geq F_0$, they are set such that a=X, b=B, c=Y, and d=D (refer to step ⑳ and FIG. 8). Those values are constants to limit the ranges to which the values of the control voltages $R_c$ and $B_c$ can be set by the operations in steps ㉑ to ㉘. That is, by setting such that $R_c = a$ when $R_c \geq a$ is NO $R_c = b$ when $R_c \leq b$ is NO $B_c = c$ when $B_c \geq c$ $B_c = d$ when $B_c \leq d$ the limit ranges of the control voltages can be set within the range surrounded by □klmn shown in FIG. 8.

The control voltages $R_c$ and $B_c$ obtained as mentioned above are sent to the control units 5 and 6 through the D/A converter 14 and the levels of the color difference signals are changed. Further, the operations in steps ② to ㉙ are repetitively executed on the basis of the changed outputs, so that the white balance can be preferably adjusted.

The setting of the limit ranges of the control voltages in the first embodiment will now be described in detail with reference to FIG. 8. In the embodiment, a check is made in step ⑯ in FIG. 3 to see if the occupied area of the single object is large or not. When the occupied area is small, the limit ranges of the control voltages lie within the area □klmn in FIG. 8 and are set so as to have the values of the control voltages $R_c$ and $B_c$ in a wide range (step ⑲).

On the other hand, when the occupied area is large, it is presumed that the high chroma object occupies almost of the area in the picture plane. Therefore, the outputs of the averaging units are largely influenced by the color of the object and there is a fear such that the white balance is largely deviated. In the case of such a state, the limit ranges of the control voltages $R_c$ and $B_c$ are made narrower and the positions of the limit ranges are set to the optimum positions on the basis of the information from another sensor or the like. In the embodiment, a check is first made in step 17 to see if the light source is a fluorescent lamp or not. When it is the fluorescent lamp, the limit ranges are set to □oqms. When the light source is a non-flicker light source, a check is made to see if the external light is an outdoor light or an indoor light on the basis of the brightness $L_s$ of the external light. When $L = L_s/L_o \geq 1 \rightarrow L = 1$, it is regarded that the external light is completely the outdoor light and a bluish light source is presumed and the limit ranges of the control voltages are set to □orlq in FIG. 7. On the other hand, for instance, when $L \leq 0.001$, the limit ranges are almost set into □osnp. In such a case, since the brightness is fairly dark, the external light is regarded to be the indoor light, a reddish light source is presumed, and the limit ranges are set. Since the light source such as a tungsten light source generally becomes reddish as the brightness becomes dark, it is considered that it is preferably matched with the setting of such limit ranges. When L is equal to an intermediate value, the limit ranges move from □osnp to □orlq in association with the change in value of L from 0.001 to 1.

The magnitude of the single object area is detected as mentioned above. When it is large, by further narrowing (limiting) the limit ranges by the information (brightness and flickering amount of the external light) from the photometry sensor 15, the white balance can be adjusted without being largely influenced by the object color.

In the embodiment, it is also possible to provide a warning apparatus to warn the photographer when the control voltages $R_c$ and $B_c$ reach the limits in the limit ranges.

Figures 9, 9A:
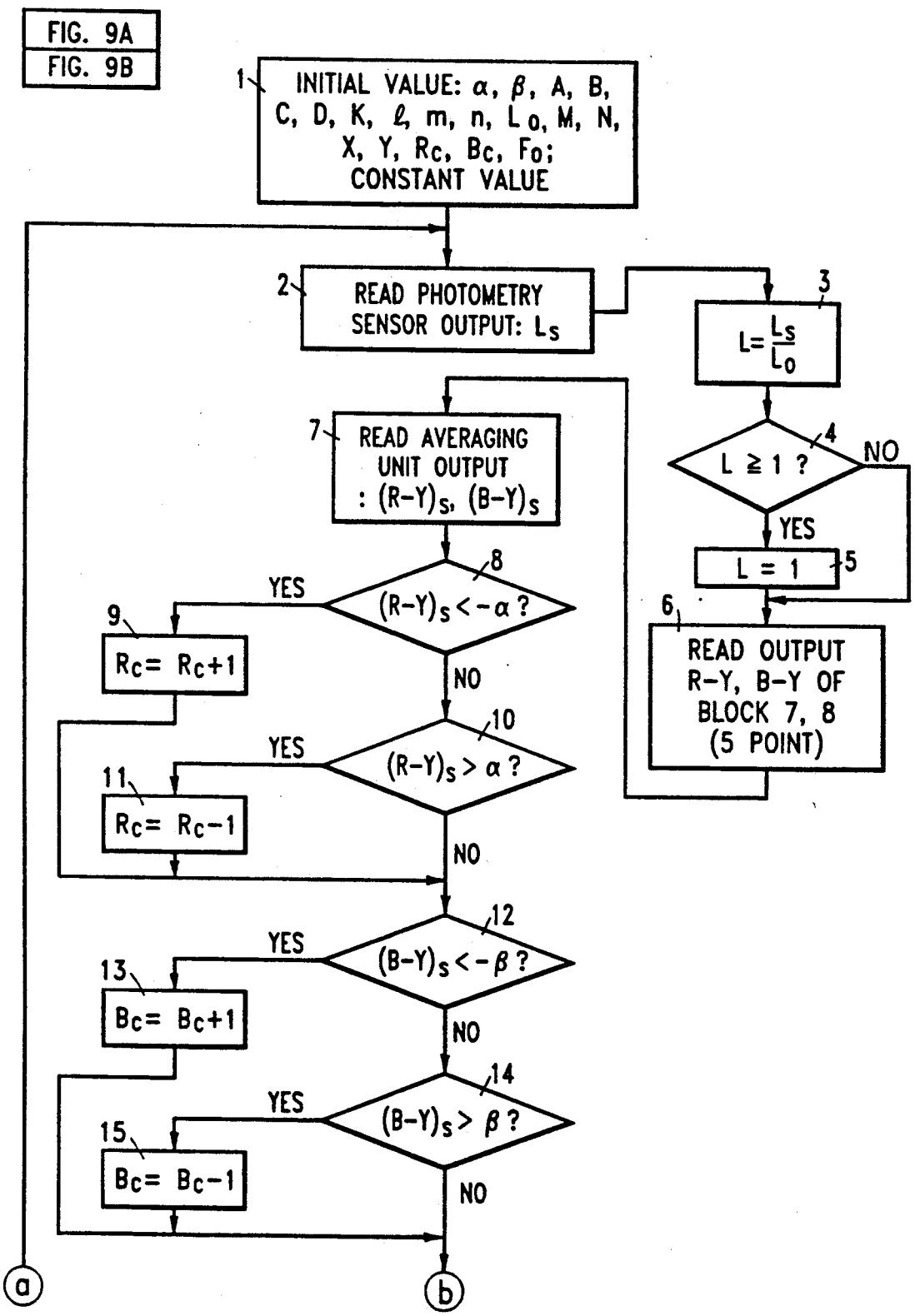
FIGS. 9A, 9B and 10 are flowcharts for explaining the operation of the image pickup device of the second embodiment of the invention.
Figure 9B:
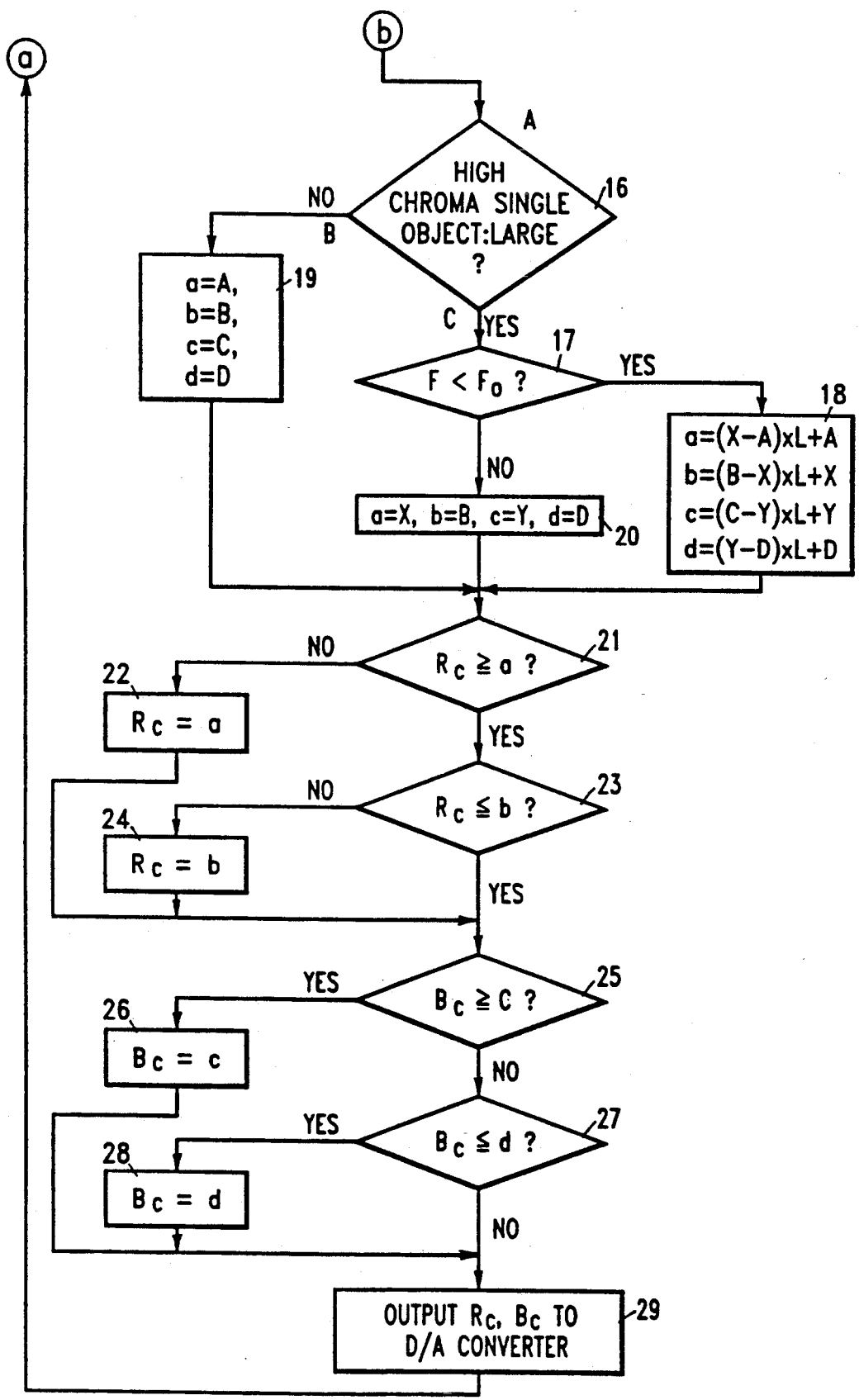
Figure 10:
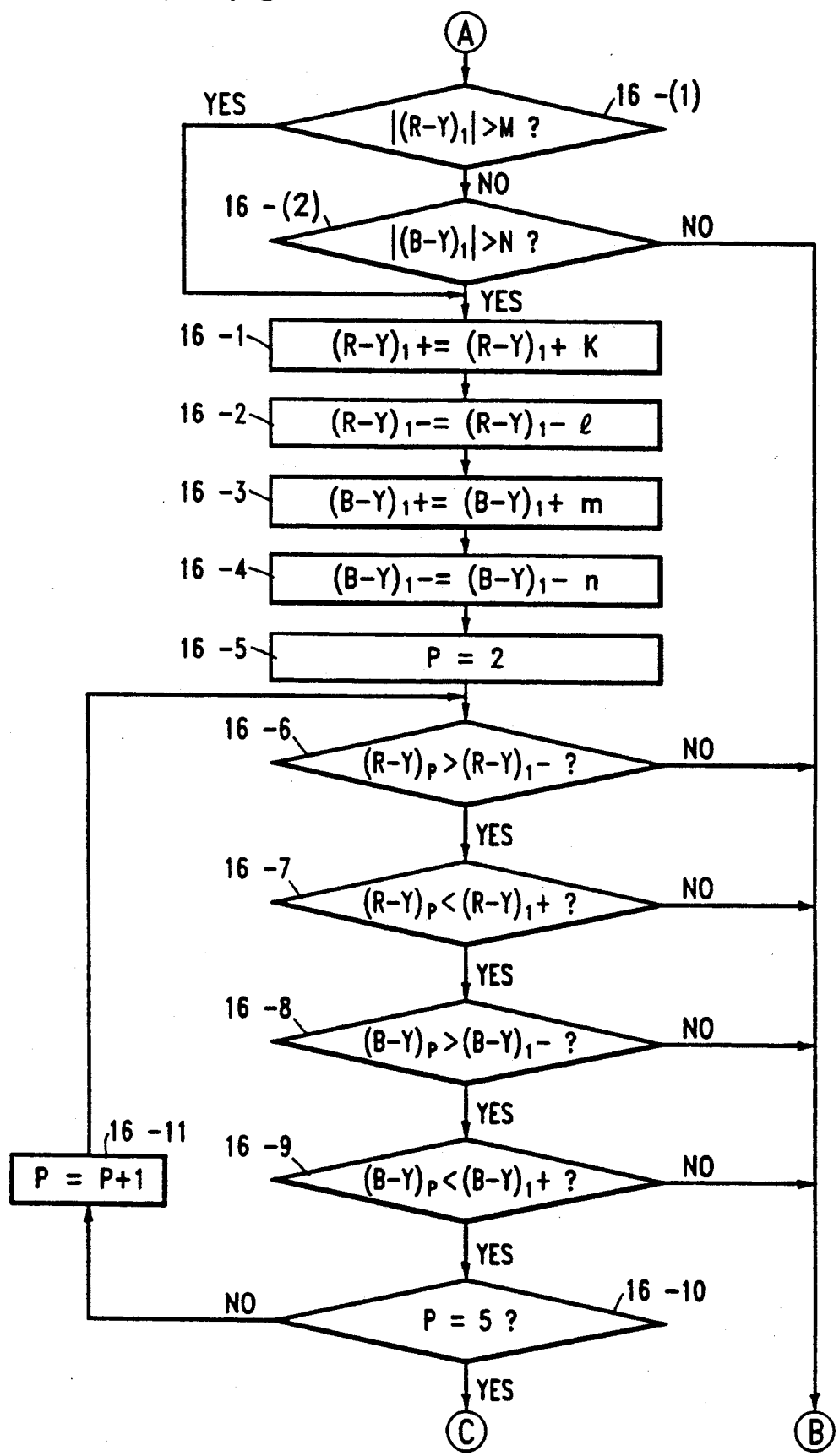

FIGS. 9 and 10 are flowcharts for explaining the second embodiment of the invention.

According to the second embodiment, in the same construction as that in the first embodiment, not only the occupied area on the picture plane of the single object but also its chroma is used as a factor for judgment.

That is, in step ⑯ in FIG. 9, the magnitude of the occupied area of the high chroma single object is judged. The processing step ⑯ is described further in detail in FIG. 10. The operations in steps ⑯-1 to ⑯-11 in FIG. 10 are substantially the same as those in the first embodiment. In step ⑯-(1) in FIG. 10, the absolute value of the color difference signal $(R-Y)_1$ at the point of 1 shown in FIG. 5 is compared with a constant M. When $|(R-Y)_1| > M$, it is determined that the object is a high chroma object and step ⑯-1 follows. When $|(R-Y)_1| \not> M$, step ⑯-(2) follows and the absolute value of the color difference signal $(B-Y)_1$ at the point of 1 in FIG. 5 is compared with a constant N. When $|(B-Y)_1| > N$, it is determined that the object is a high chroma object and step ⑯-1 follows. When $|(B-Y)_1| \not> N$, it is decided that the object is a low chroma object and the processing routine advances to ⑱, namely, step ⑲ in FIG. 9.

By the above operations, a check is made to see if the occupied area of the single high chroma object is large or small. When it is large, the limit ranges of the control voltages are further narrowed as shown in the first embodiment.

Due to this, when the low chroma object which doesn't exert an adverse influence on the white balance adjustment occupies the large area in the picture plane, the range of the control voltages are not narrowed but the range is narrowed only in the case of the high chroma object which exerts an adverse influence. Therefore, the more preferable white balance adjustment can be performed.

Figure 11:
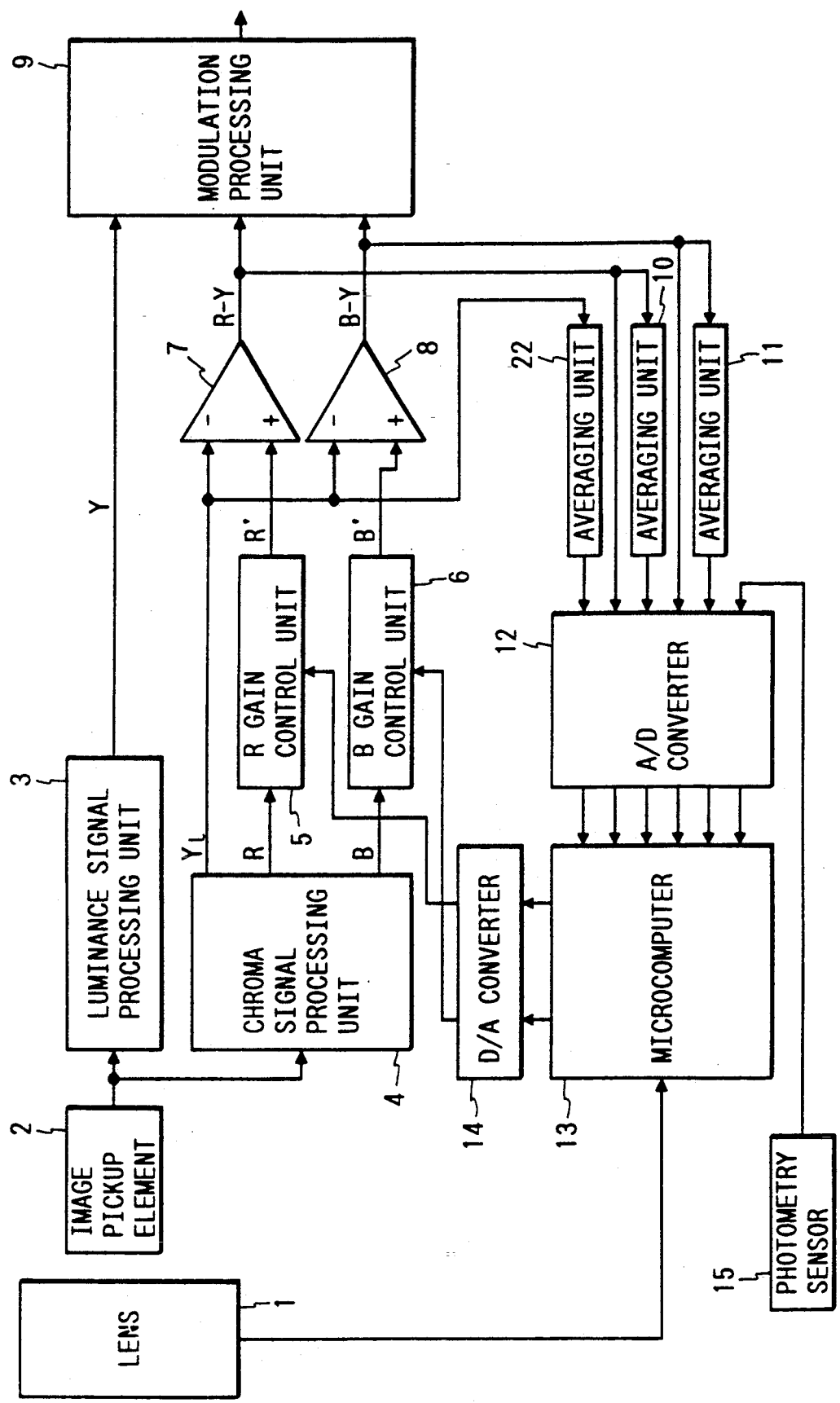
FIG. 11 is a block diagram showing a construction of an image pickup device of the third embodiment of the invention.

FIG. 11 is a block diagram showing the third embodiment of the invention. Reference numerals 1 to 15 designate the same component element as those shown in the first embodiment. Reference numeral 22 denotes an averaging unit having a construction similar to those of the averaging units 10 and 11. The operation of the third embodiment will now be described hereinbelow. The operations of the component elements 1 to 11, 14, and 15 are substantially the same as those in the first embodiment.

In the third embodiment, in addition to the (R-Y) value, average value of (R-Y), (B-Y) value, average value of (B-Y), and output of the photometry sensor, the signal which is obtained by averaging the $Y_L$ output of the chroma signal processing unit 4 by the averaging unit 22 is supplied to the microcomputer 13 through the A/D converter 12. The microcomputer 13 derives the R, G, and B signals from average signals $Y_{LS}$, $(R-Y)_s$, and $(B-Y)_s$ of $Y_L$, (R-Y), and (B-Y) by executing, for instance, the following calculations.

$R = (R-Y)_s + Y_{LS} = R$ $B = (B-Y)_s + Y_{LS} = B$ $G = (Y_{LS} - 0.30 \cdot R - 0.11 \cdot B)/0.59$ A ratio of R to G and a ratio of B to G are calculated from the R, B, and G signals derived as mentioned above. The control voltages $R_c$ and $B_c$ such that the ratios R/G and B/G are equal to 1 are calculated. The values of $R_c$ and $B_c$ obtained are sent to the R and B gain control units 5 and 6 through the D/A converter 14, thereby adjusting the white balance. In the third embodiment as well, the magnitude of the single object area is discriminated. When it is large, the limit ranges of the control voltages $R_c$ and $B_c$ are further limited on the basis of the values of light amount and flickering amount which are obtained from the output of the photometry sensor 15 in a manner similar to the first embodiment. Due to this, the white balance can be preferably adjusted. Further, in the third embodiment, since the control voltages $R_c$ and $B_c$ can be immediately calculated from the signals $(R-Y)_s$, $(B-Y)_s$, and $Y_{LS}$, the embodiment is suitable for a white balance adjusting apparatus in an image pickup device such as an electronic still camera or the like which needs a high quick response speed. On the other hand, since the R, G, and B signals are calculated by once obtaining the color difference signals (R-Y) and (B-Y), the output color of the averaging unit can be easily clipped to the high chroma object signal. It is possible to prevent that an adverse influence is exerted on the object color. If there is no need to execute such a clipping process, the signals in the R, G, and B states before the color difference signals are derived can be also directly sent to the averaging units.

Figure 12:
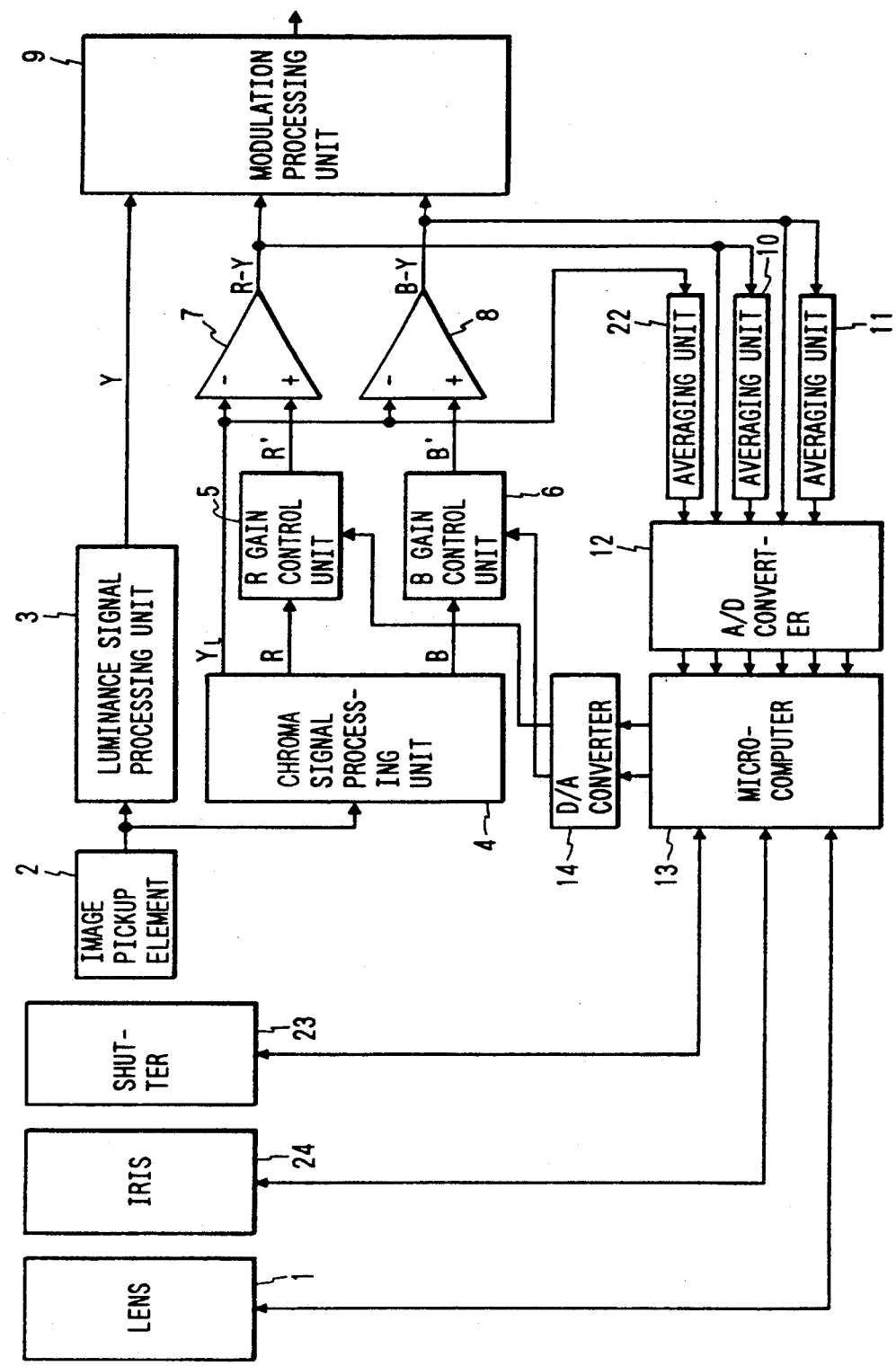
FIG. 12 is a block diagram showing a construction of an image pickup device of the fourth embodiment of the invention.

FIG. 12 is a block diagram showing the fourth embodiment of the invention. Reference numerals 1 to 14 and 22 designate the same component elements as those in the embodiment of FIG. 11. Reference numeral 23 denotes a shutter to decide an exposing time and 24 indicates an iris.

In the fourth embodiment, the photometry sensor 15 used in the first to third embodiments mentioned above is omitted and, in place of it, the brightness of the external light and the flickering amount are measured by the shutter, iris, and $Y_L$ output. That is, the brightness is measured and detected by a shutter speed and an iris value when they are controlled by the microcomputer 13 and the $Y_L$ signal level is a proper level. In addition, output signals are intermittently obtained from the image pickup element 2 and a time-dependent change in the $Y_L$ output of the image pickup element 2 is measured, thereby detecting the flickering amount. From the above information, the limit ranges of the control voltages $R_c$ and $B_c$ when the single object area is large are decided. In the embodiment, since the photometry sensor 15 can be omitted, the costs can be reduced.

Figure 13:
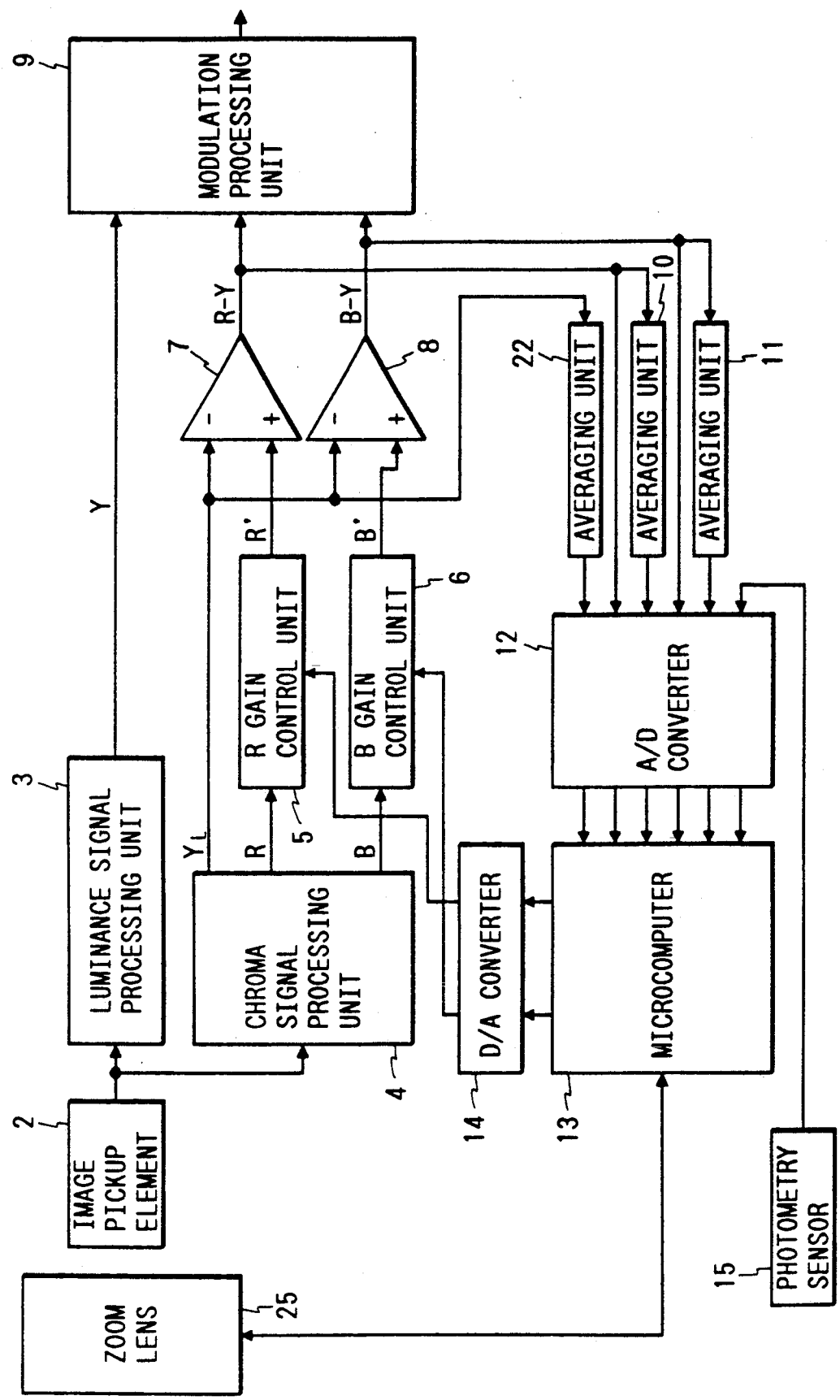
FIG. 13 is a block diagram showing a construction of an image pickup device of the fifth embodiment of the invention.

FIG. 13 is a block diagram of the fifth embodiment of the invention. Reference numerals 1 to 15 and 22 designate the same component elements as those shown in the third embodiment. Reference numeral 25 denotes a zoom lens to change a focal distance of an image pickup optical system.

According to the embodiment, in an image pickup device such as, particularly, an electronic still camera or the like in which there is no need to always generate an image pickup signal, when it is determined that the single object area is large, a focal distance of the zoom lens is first once set into a short distance upon measurement of the data, that is, in steps ⑦ to ⑭ and ㉑ to ⑱ in FIG. 3, thereby obtaining a wide lens state. In this state, the control voltages $R_c$ and $B_c$ are decided. Upon photographing, the focal distance is returned to an arbitrary focal distance and the photographing is executed. Thus, the area of the high chroma object color in the picture plane can be reduced as small as possible. The data of a more preferable white balance adjustment is derived.

Figure 14:
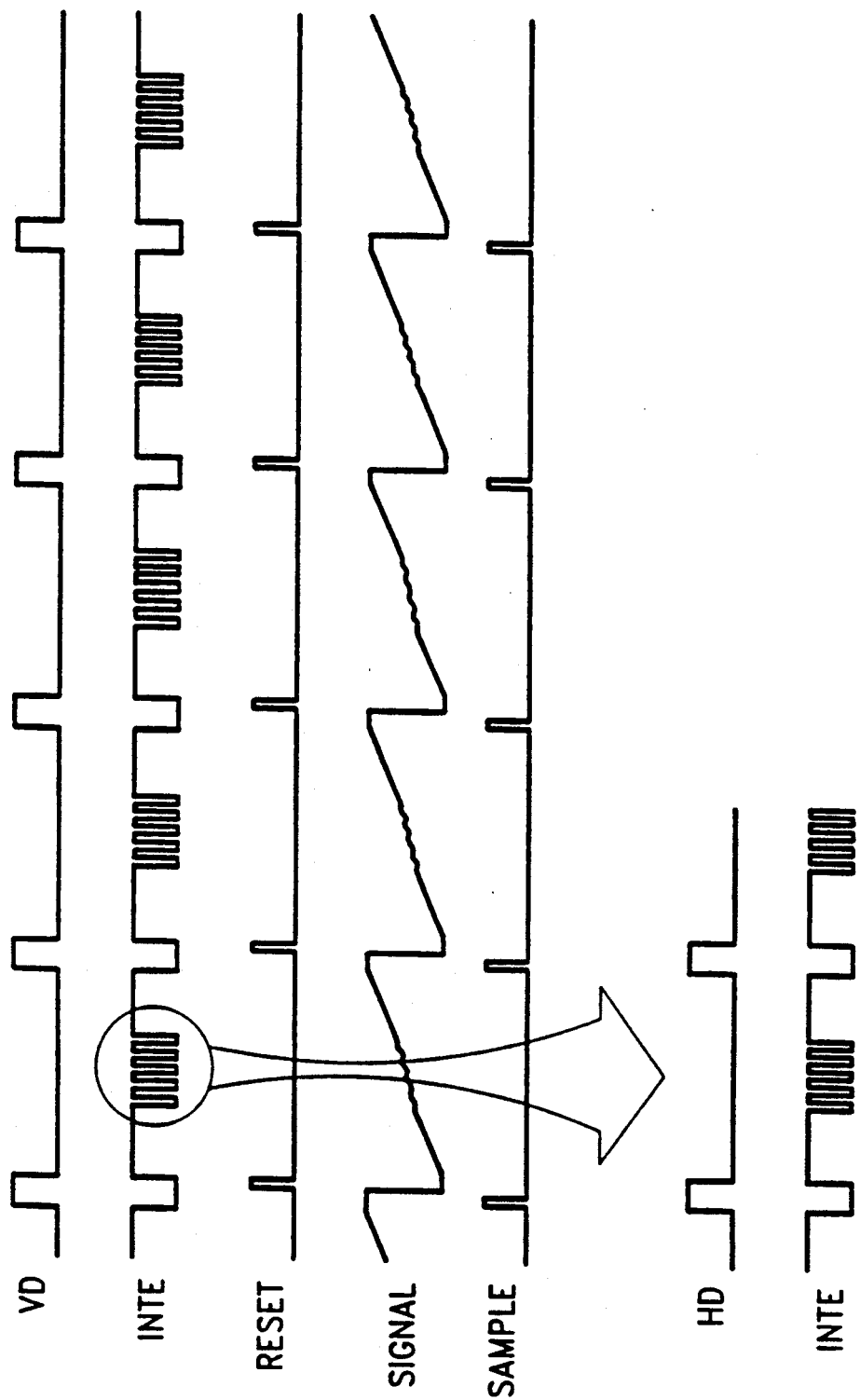
FIG. 14 is a timing chart for explaining an image pickup device of the sixth embodiment of the invention.

FIG. 14 is a timing chart of the main sections in the sixth embodiment of the invention and show switching periods of time and averaging periods of time of the averaging units corresponding to the averaging units 10, 11, and 22 in FIG. 13. The sixth embodiment has substantially the same construction as that shown in FIG. 2 except the portions regarding the average values.

As will be also obviously understood from FIG. 14, according to the embodiment, when it is determined that the single object area is large, a part of the averaging period is made intermittent. That is, in such a case, it is presumed that the high chroma object occupies a large area at the center of the picture plane. Therefore, by using the intermittent pulses for the central portions (for both of the horizontal and vertical scanning periods of time) like the signal INTE in FIG. 14, the sampling periods of time in such portions are reduced and the influences are prevented and the photographing can be performed at the good white balance.

That is, in the embodiment, upon averaging, a weight is applied to a partial area in the picture plane. In place of using the intermittent pulses as mentioned above, it is also possible to apply weights by multiplying proper coefficients to the color difference signals in the area of the central portion of the picture plane and to execute the averaging process.

Figure 15:
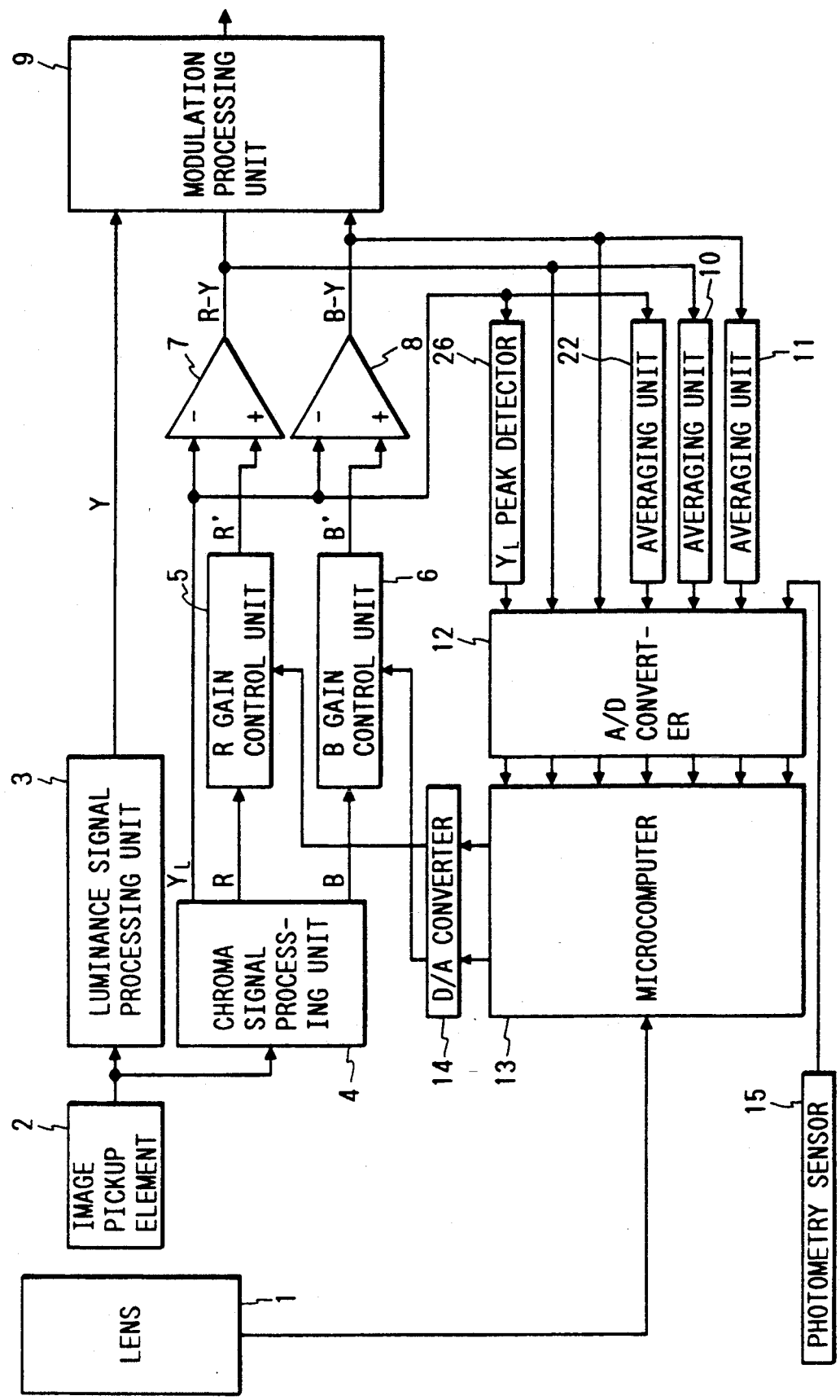
FIG. 15 is a block diagram for explaining an image pickup device of the seventh embodiment of the invention.
Figure 16:
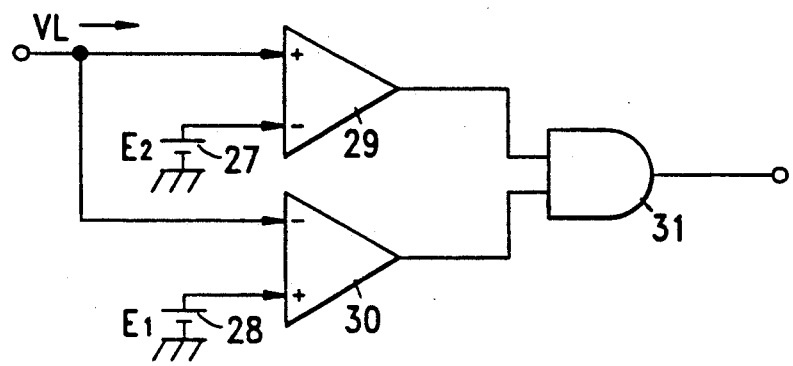
FIG. 16 is a diagram showing a construction of a peak detector in FIG. 15.

FIG. 15 is a block diagram showing the seventh embodiment of the invention. Reference numerals 1 to 15 and 22 denote the same component elements as those shown in the third embodiment. Reference numeral 26 denotes a comparator unit ($Y_L$ PEAK detector) to detect whether the $Y_L$ signal lies within a predetermined level range or not. FIG. 16 shows a circuit diagram of the comparator unit 26.

The operation of the seventh embodiment will now be described hereinbelow. The operations of the component elements 1 to 11, 15, and 22 are substantially the same as those in the third embodiment. In the comparator unit 26, when the $Y_L$ signal lies within a predetermined level range, namely, $$E_2 < Y_L < E_1$$

a high level signal is generated. In the other cases, a low level signal is generated.

The values of $E_1$ and $E_2$ in the above case are set so as to correspond to the signal levels of, for example, 105% and 90% of the $Y_L$ level.

That is, when the $Y_L$ level lies within a range from 90 to 105%, an output signal $Y_L P$ of the $Y_L$ PEAK detector 26 is set to the high level. When the $Y_L P$ signal is set to the high level, this means a situation such that the luminance is high and no color saturation occurs. Therefore, it is considered that the object corresponds to the low chroma object. Therefore, when the $Y_L P$ signal is at the high level, the color difference signals R-Y and B-Y are sampled by the A/D converter 12 and the sampled digital signals are sent to the microcomputer 13. The white balance is adjusted on the basis of the output signals $Y_L$, R-Y, and B-Y of the microcomputer 13. The means for deriving the control voltages $R_c$ and $B_c$ from the signals $Y_L$, R-Y, and B-Y is similar to that in the third embodiment.

Further, in the microcomputer 13, the white balance adjusting method using the $Y_L$ PEAK detector and the adjusting method using the averaging units are combined and the control voltages are derived so as to compensate the drawbacks of both of the above methods. For instance, there is considered a method whereby when the detection color difference signals of both of the above methods are selectively used, the information of the method by which the lower chroma signal has been detected is used.

In the embodiment, when it is determined that the single object area is large, by more preferentially using the color difference signal by the $Y_L$ PEAK detecting method, for instance, when the difference between the chroma of the color difference signal extracted by the $Y_L$ PEAK detecting method and the saturation of the averaged color difference signal lies within a predetermined range, by using the former color difference signal, the influence on the deterioration of the white balance adjustment by the averaging method can be minimized.

In each of the above embodiments, the A/D input terminals for the color difference signals as outputs of the matrix amplifiers 7 and 8 and the A/D input terminals for the average outputs have independently been provided. However, as a construction to turn on/off the averaging function of the averaging unit, the input signals are directly generated when the averaging function is OFF, and the average outputs and color difference signals are time sequentially supplied to the A/D converter 12, thereby enabling the number of input terminals of the A/D converter can be reduced.

In each of the above embodiments, the sampling positions of the color difference signals and the number of sampling positions have been set as shown in FIG. 5. However, it is also possible to discriminate the single object area by setting arbitrary sampling positions and an arbitrary number of sampling positions.

Figure 17:
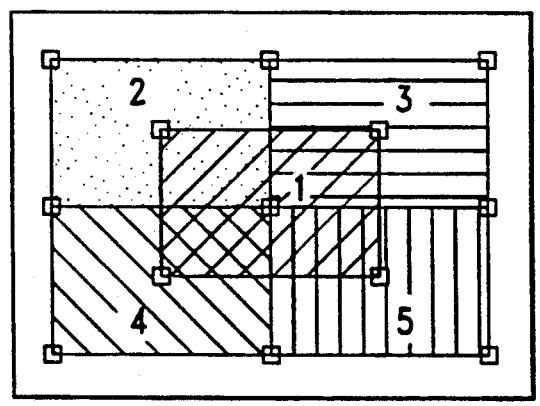
FIG. 17 is a diagram showing another example of sampling patterns to determine an occupied area.

For instance, in the sixth embodiment, it is also possible to construct in a manner such that thirteen sampling points are set as shown in FIG. 17 and intermittent pulses are generated (weights are applied) to only the position (either one of the areas ① to ⑤ in the diagram) at which the area of a predetermined level or higher has been detected.

By changing the positions and the number of sampling points as mentioned above, even when the single object exists at any position in the picture plane, the area can be detected and corrected.

In each of the above embodiments, although the color difference signals have been used to judge the single object area, another signal format such as a luminance signal or the like can be also used.

As described above, according to the devices of the first to sixth embodiments mentioned above, the white balance can be always preferably adjusted irrespective of the condition such that the single object occupies almost of the picture plane.

Figure 18:
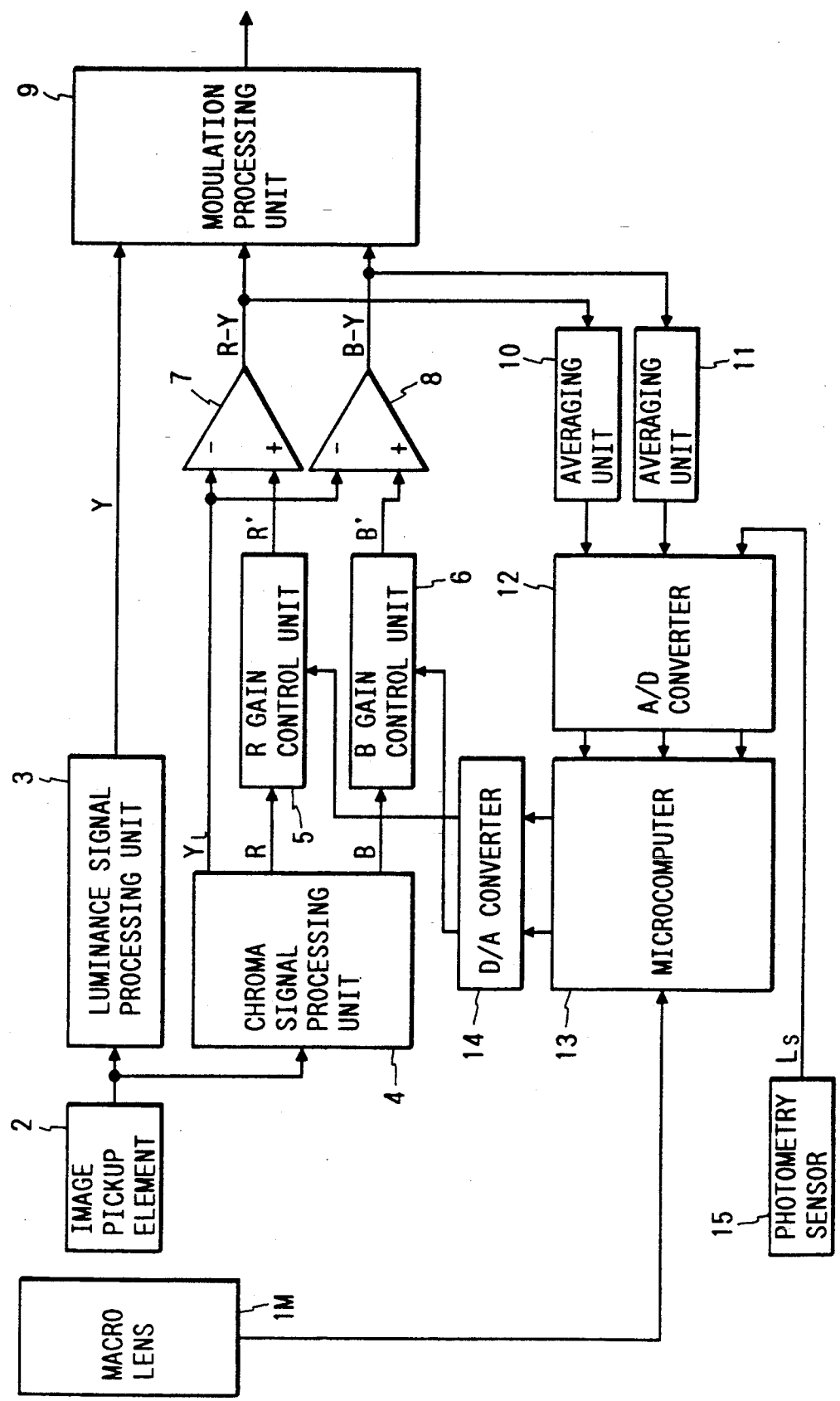
FIG. 18 is a block diagram showing a construction of an image pickup device of the eighth embodiment of the invention.

FIG. 18 is a block diagram showing a construction of an image pickup device according to the eighth embodiment of the invention. In the diagram, the same component elements as those shown in the first embodiment of the invention shown in FIG. 2 are designated by the same reference numerals and their detailed descriptions are omitted here.

Figures 19, 19A:
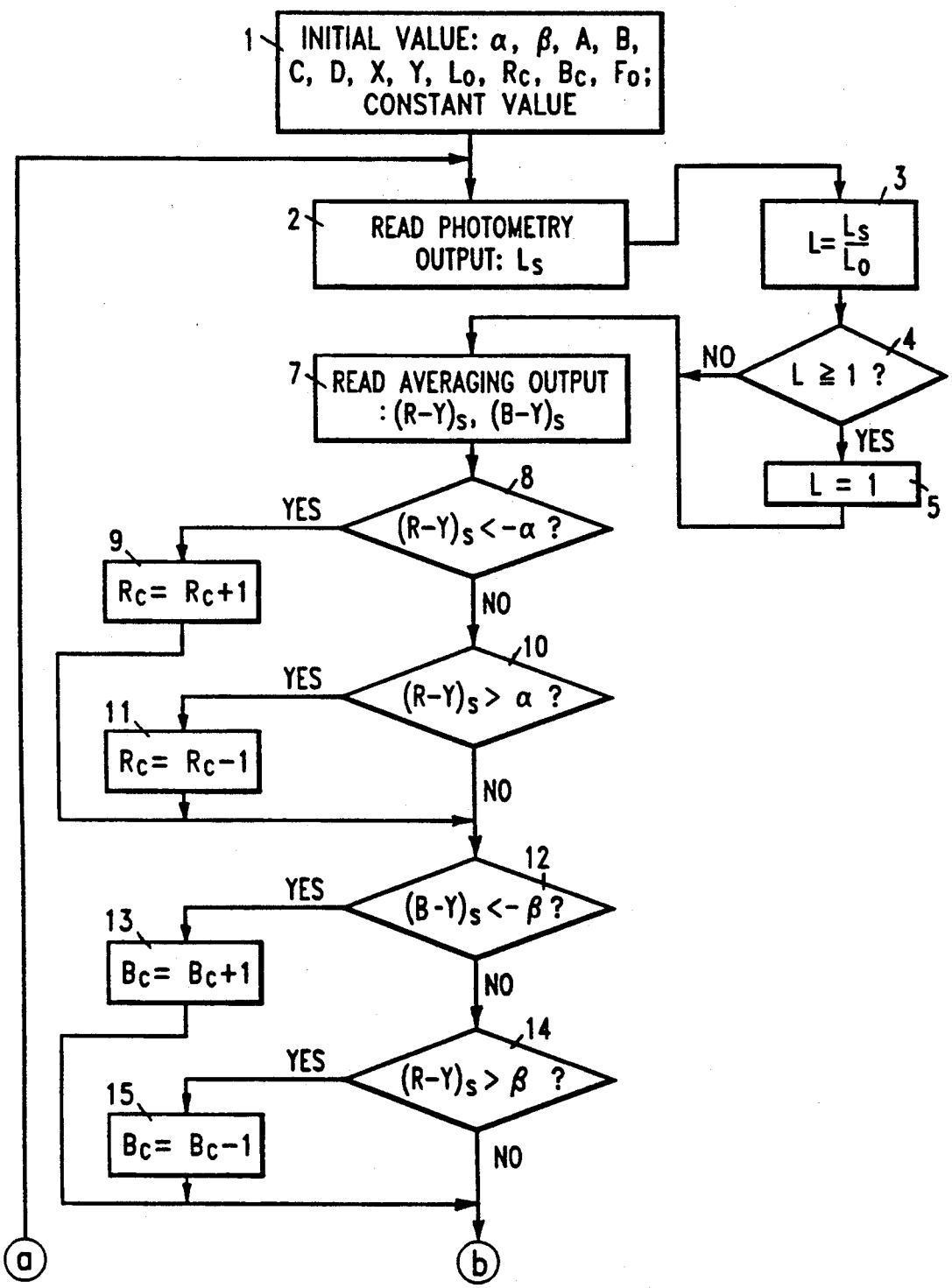
FIGS. 19A and 19B is a flowchart showing the operation of the device of FIG. 18.
Figure 19B:
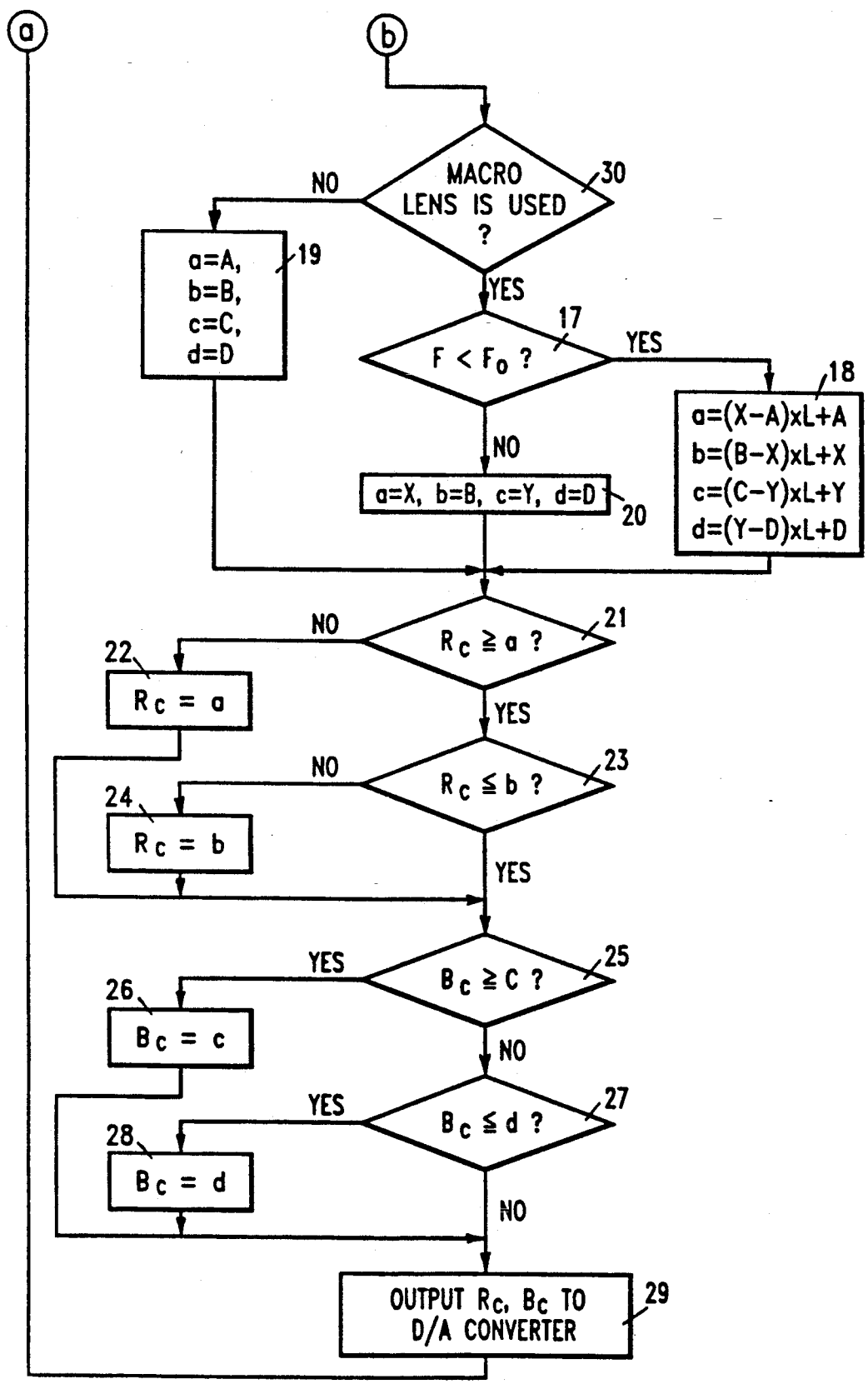

In the diagram, reference numeral 1M denotes a macro lens. The microcomputer 13 can detect a using state of the macro lens 1M. FIG. 19 is a flowchart for explaining the operation of the image pickup device of the eighth embodiment. FIG. 19 differs from the flowchart shown in FIG. 3 with respect to the following point. In FIG. 3, the magnitude of the single object area has been discriminated by the levels of the sampling points of the color difference signals R-Y and B-Y in step (16). On the other hand, in the eighth embodiment, the using state of the macro lens 1M is detected in step (30) to execute a process similar to that in step (16) in FIG. 3.

That is, when the macro lens 1M is used or when the image pickup lens is used in the macro region, the processing routine advances to step (17). Ranges of the possible values of the white balance control voltages $R_c$ and $B_c$ are limited in steps (17), (18), and (20) in a manner similar to the first embodiment. On the other hand, when the macro lens 1M is not used, step (19) follows and the ranges of the possible values of the control voltages $R_c$ and $B_c$ are set into a wide range surrounded by the points k, l, m, and n in FIG. 8.

The other operations are similar to those in the first embodiment. In the case of the macro photographing, it is considered that the occupied area of the single object is generally large. Therefore, an effect similar to that in the first embodiment can be expected. On the other hand, since there is no need to execute any special calculation or the like with respect to the discrimination of the single object area, there is an advantage such that the processing time can be reduced as compared with the first embodiment.

Figure 20:
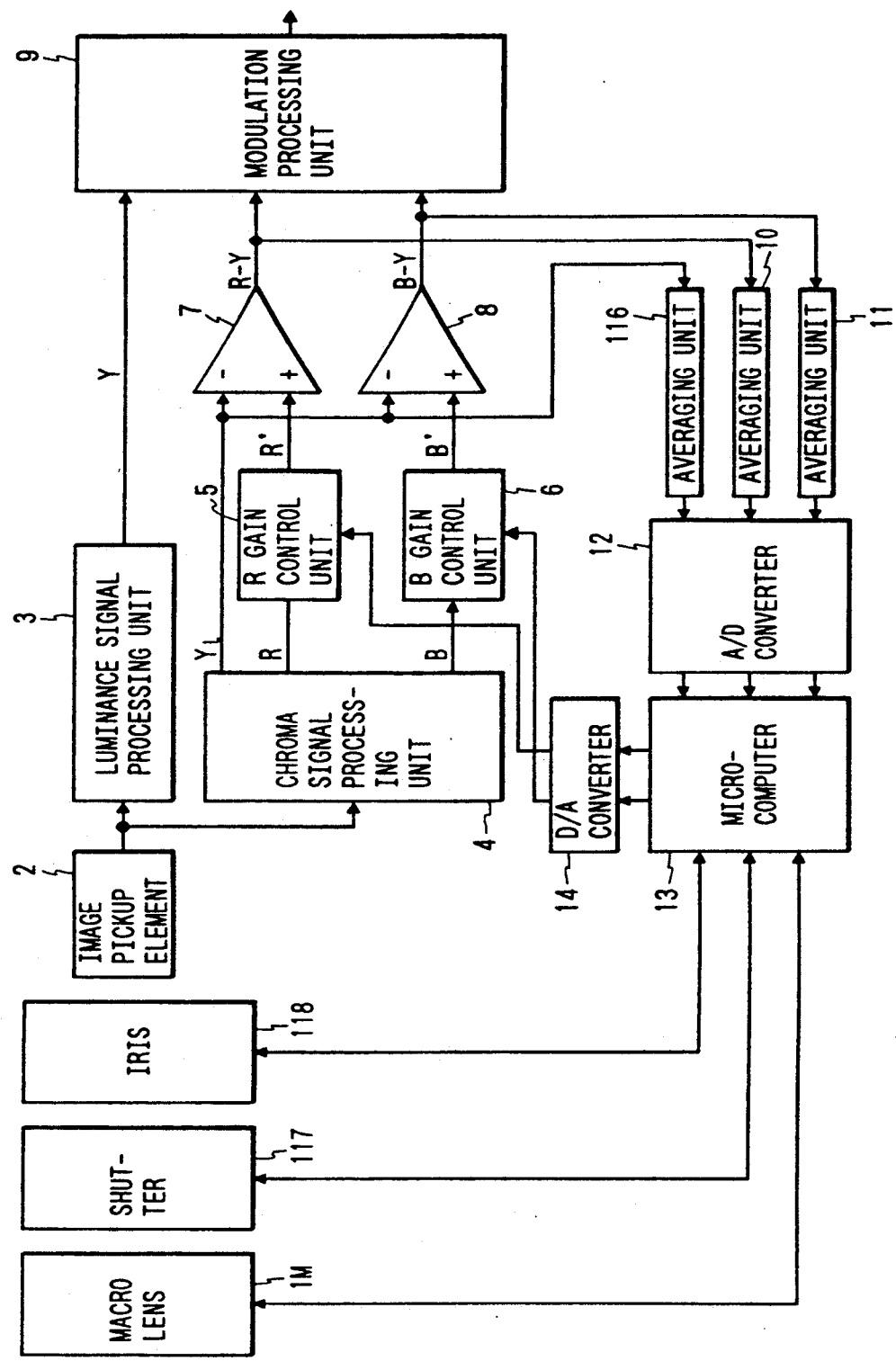
FIG. 20 is a block diagram showing a construction of an image pickup device of the ninth embodiment of the invention.

FIG. 20 is a diagram showing a construction of an image pickup device of the ninth embodiment of the invention. The microcomputer 13 can obtain states of an iris 118 and a shutter 117 in a manner similar to the fourth embodiment shown in FIG. 12. In the ninth embodiment as well, in a manner similar to the eighth embodiment, whether the ranges of the possible values of the control voltages $R_c$ and $B_c$ are limited or not is switched in accordance with the result of the discrimination regarding whether the macro photographing is performed or not. At that time, the states of the iris 118 and shutter 117 are measured in a manner similar to the fourth embodiment as information of the brightness of the object to determine the limited ranges. The presence or absence of the flicker is decided by a level fluctuation period of the luminance signal $Y_L$ from the image pickup element 2.

Figure 21:
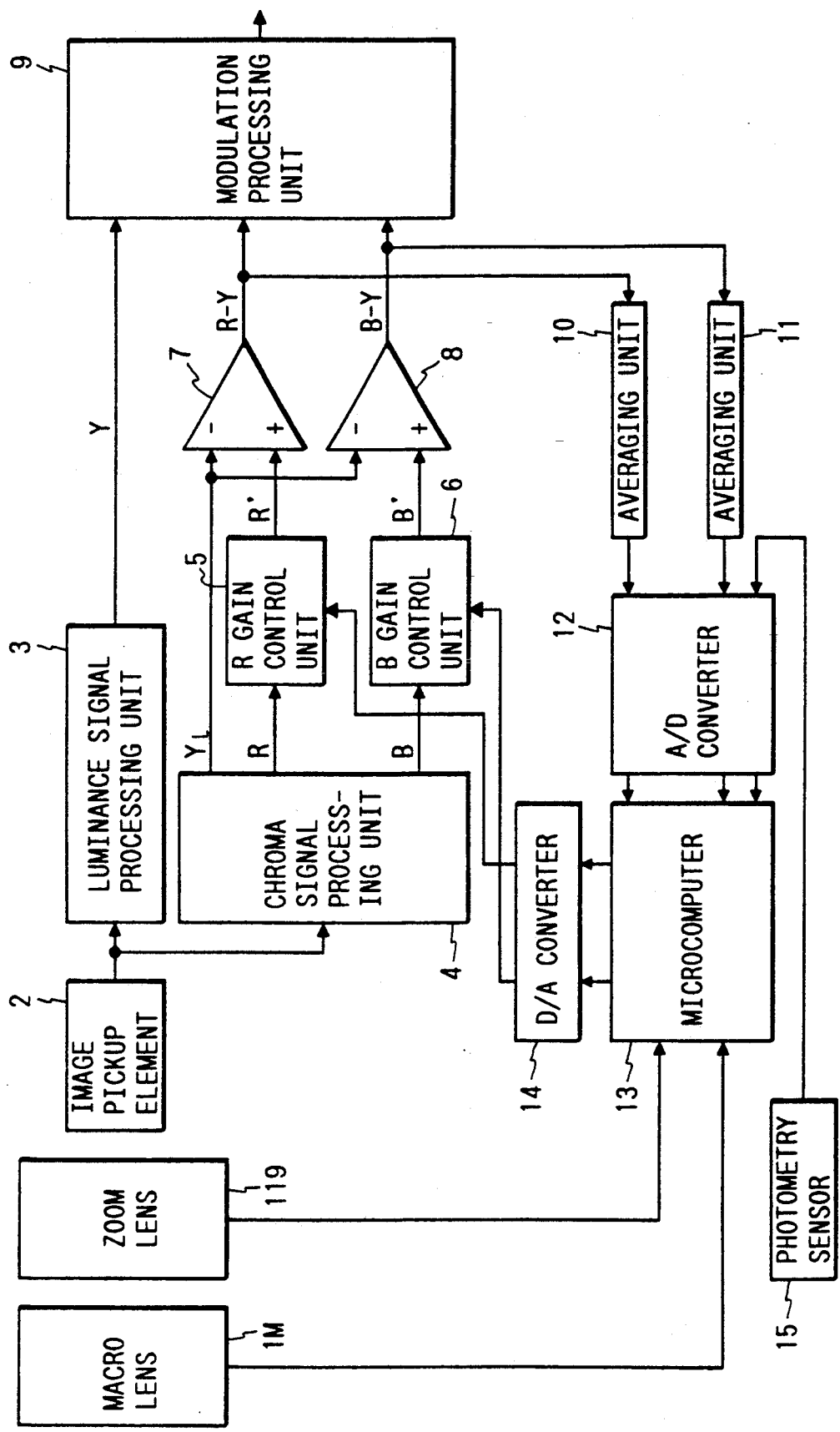
FIG. 21 is a block diagram showing a construction of an image pickup device of the tenth embodiment of the invention.

FIG. 21 is a diagram showing a construction of an image pickup device of the tenth embodiment of the invention. The microcomputer 13 can control a state of a zoom lens 119 in a manner similar to the fifth embodiment shown in FIG. 13. When the macro lens 1M is used, the zoom lens 119 is driven to the wide mode side for a period of time when the white balance control voltages $R_c$ and $B_c$ are being formed. The other operations are substantially the same as those in the fifth embodiment.

Even by the image pickup devices of the eighth to tenth embodiments as mentioned above, an effect similar to the effect in each of the foregoing embodiments can be expected and the processes can be promptly executed.

What is claimed is:

1. An image pickup device comprising:
   (a) image pickup means for forming a video signal from an object light;
   (b) adjusting means for adjusting a white balance of the video signal which is generated from the image pickup means;
   (c) discriminating means for discriminating a size of an area which is occupied by a single object in a picture with respect to the video signal, said discriminating means detecting a correlation of color signals on a plurality of sampling points which are distributed and arranged on the picture plane; and
   (d) control means for controlling the operation of the adjusting means in accordance with an output of the discriminating means.

2. A device according to claim 1, wherein said discriminating means uses only the color signal of a high chroma.

3. A device according to claim 1, wherein said control means switches an adjustment range by said adjusting means in accordance with an output of said discriminating means.

4. A device according to claim 3, wherein
said adjusting means includes a plurality of gain adjusting circuits for relatively adjusting gains of a plurality of color signals in the video signal which is generated from the image pickup means and a gain control circuit to determine control voltages of said plurality of gain control circuits in accordance with color temperature information,
and said control means switches limit ranges of the control voltages in accordance with the output of said discriminating means.

5. A device according to claim 4, wherein said control means sets the limit range of the control voltage into a first range in the case where it is determined by the discriminating means that the size of an area which the single object occupies in the picture plane is smaller than a predetermined size, and the control means sets the limit range of the control voltage into a second range narrower than the first range in the case where it is determined that the size which the single object occupies in the picture is larger than the predetermined size.

6. A device according to claim 5, further comprising flicker detecting means for detecting a flicker of a light source,
and wherein said control means can changeably set the second range in accordance with an output of the flicker detecting means.

7. A device according to claim 5, further comprising generating means for generating informatiion according to the brightness of the object, and wherein said control means can changeably set the second range in accordance with an output of said generating means.

8. A device according to claim 7, wherein said generating means includes a photometry circuit which generates an output at a level corresponding to the brightness of the object, and said control means variably sets the second range in accordance with a magnitude of the output level of the photometry circuit.

9. A device according to claim 8, wherein said control means switches the second range in accordance with the presence or absence of a fluctuation of the output level of the photometry circuit.

10. A device according to claim 7, wherein said generating means fetches iris information and shutter speed information of said image pickup means and generates information according to the brightness of the object in accordance with said iris information and said shutter speed information.

11. A device according to claim 1, wherein said adjusting means includes signal processing means for forming color temperature information in accordance with levels of a plurality of color signal in the video signal which is generated from said image pickup means, and said control means switches extracting formats of said plurality of color signals by the signal processing means in accordance with an output of the discriminating means.

12. A device according to claim 11, wherein said control means controls such that said signal processing means extracts an average level of said plurality of color signals of the whole picture plane in the case where it is determined by the discriminating means that a size of an area which the single object occupies in the picture is smaller than a predetermined size, and said signal processing means extracts only said plurality of color signals in the portion where a luminance level in a predetermined range in the case where it is determined that the size which the single object occupies in the picture is larger than the predetermined size.

13. A device according to claim 11, wherein said control means controls such that said signal processing means extracts a relatively large amount of said plurality of color signals in the edge portion of the picture plane than the central portion thereof in the case where it is determined by the discriminating means that a size of an area which the single object occupies in the picture is larger than a predetermined size as compared with case where it is determined that the area which the single object occupies is smaller than the predetermined size.

14. A device according to claim 1, wherein said adjusting means includes signal processing means for forming color temperature information in accordance with levels of a plurality of color signals in the video signal which is generated from the image pickup means, and said control means controls a field angle for picking up an image of said image pickup means in accordance with an output of the discriminating means.

15. A device according to claim 14, wherein said control means sets the field angle for picking up the image to a wide angle in the case where it is determined by the discriminating means that a size of an area which the single object occupies in the picture is larger than a predetermined size as compared with the case where it is determined that the area which the single object occupies is smaller than the predetermined size.

16. An image pickup device comprising:
(a) image pickup means for forming a video signal from an object light;
(b) adjusting means for adjusting a white balance of the video signal which is generated from the image pickup means, said adjusting means including signal processing means for forming color temperature information in accordance with levels of said plurality of color signals in the video signal which is generated from the image pickup means;
(c) detecting means for detecting whether a macro photographing is performed by the image pickup means or not; and
(d) control means for controlling the operation of the adjusting means in accordance with a detection result of said detection means, said control means controlling a field angle for picking up an image of said image pickup means in accordance with whether the macro photographing is performed by the image pickup means or not.

17. A device according to claim 16, wherein said control means switches an adjustment range by the adjusting means in accordance with whether the macro photographing is performed by the image pickup means or not.

18. A device according to claim 17, wherein said adjusting means includes a plurality of gain adjusting circuits for relatively adjusting gains of a plurality of color signals in the video signal which is generated from the image pickup means and a gain control circuit for determining control voltages of said plurality of gain control circuits in accordance with color temperature information, and wherein said control means switches limit ranges of the control voltages in accordance with the detection result of said detection means.

19. A device according to claim 18, wherein said control means sets the limit range of the control voltage into a first range in the case where the macro photographing is not performed by the image pickup means, and the control means sets the limit range of the control voltage into a second range narrower than the first range in the case where the macro photographing is performed.

20. A device according to claim 19, further comprising generating means for generating information according to the brightness of the object,
and wherein said control means can changeably set second range in accordance with an output of the generating means.

21. A device according to claim 16, wherein said control means sets a field angle for picking up an image of said image pickup means to a wide angle in the case where it is determined by the discriminating means that a size of an area which the single object occupies in the picture larger than a predetermined size as compared with the case where it is determined that the area which the single object occupies is smaller than the predetermined size.

22. An image pickup device comprising:
(a) image pickup means for forming a video signal from an object light;
(b) adjusting means for adjusting a white balance of the video signal which is generated from the image pickup means;
(c) discriminating means for discriminating a size of an area which is occupied by similar color or similar brightness in a picture with respect to the video signal, said discriminating means including an extracting circuit for extracting a plurality of video information in a plurality of different areas in the picture and a detection circuit for detecting a correlation among the plurality of video information; and (d) preventing means for preventing said adjusting means from using a video signal in the area occupied by the similar color or similar brightness in accordance with an output of the discriminating means.

* * * * *